(12) United States Patent
Stawski

(10) Patent No.: US 11,446,883 B2
(45) Date of Patent: Sep. 20, 2022

(54) RADIUS FILLER FOR WET COMPOSITE LAYUP

(71) Applicant: The Boeing Company, Chicago, IL (US)

(72) Inventor: Stanley Stawski, Camano Island, WA (US)

(73) Assignee: The Boeing Company, Chicago, IL (US)

( * ) Notice: Subject to any disclaimer, the term of this patent is extended or adjusted under 35 U.S.C. 154(b) by 406 days.

(21) Appl. No.: 16/521,550

(22) Filed: Jul. 24, 2019

(65) Prior Publication Data

US 2021/0023796 A1 Jan. 28, 2021

(51) Int. Cl.
| | |
|---|---|
| *B29C 70/02* | (2006.01) |
| *B29C 70/48* | (2006.01) |
| *B29C 70/00* | (2006.01) |
| *B29C 70/74* | (2006.01) |
| *B64C 3/26* | (2006.01) |
| *B32B 5/12* | (2006.01) |
| *B32B 1/00* | (2006.01) |
| *B32B 5/26* | (2006.01) |
| *B32B 5/14* | (2006.01) |

(Continued)

(52) U.S. Cl.
CPC ............ *B29C 70/021* (2013.01); *B29C 70/00* (2013.01); *B29C 70/48* (2013.01); *B29C 70/745* (2013.01); *B32B 1/00* (2013.01); *B32B 5/12* (2013.01); *B32B 5/145* (2013.01); *B32B 5/26* (2013.01); *B64C 3/26* (2013.01); *B29C 70/42* (2013.01); *B29K 2105/12* (2013.01); *B29K 2105/16* (2013.01); *B29L 2031/3085* (2013.01); *B32B 2260/023* (2013.01); *B32B 2260/046* (2013.01); *B32B 2307/54* (2013.01); *B32B 2605/18* (2013.01); *B64C 3/18* (2013.01); *B64C 2001/0072* (2013.01)

(58) Field of Classification Search
CPC ..... B29D 99/0005; B29C 67/00; B29C 70/48; B29C 70/24; B29C 70/44; B29C 70/70; B29C 70/72; B22F 3/105; B64C 1/06
USPC ........................................ 428/297.4
See application file for complete search history.

(56) References Cited

U.S. PATENT DOCUMENTS

2007/0208447 A1 9/2007 Ostrega
2015/0360396 A1* 12/2015 Thomas ............. B29D 99/0005
428/221

OTHER PUBLICATIONS

Engineering ToolBox, Young's Modulus for Some Materials, accessed online Feb. 12, 2022.*

(Continued)

*Primary Examiner* — Camie S Thompson

(57) ABSTRACT

A method of manufacturing a cured composite structure includes placing a radius filler element into a radius cavity extending along a length of a composite base member formed of dry fiber material comprised of reinforcing fibers. The radius filler element is formed of a radius filler material. The method also includes infusing resin into the dry fiber material, and chemically reacting the resin with the radius filler material to create a mixture of resin and radius filler material along side surface interfaces between the radius filler element and the composite base member. The method additionally includes curing or solidifying the resin, and allowing solvent in the resin to evaporate causing hardening of the mixture and bonding of the radius filler element to the composite base member, and resulting in a cured composite structure.

20 Claims, 12 Drawing Sheets

(51) Int. Cl.
*B29K 105/12* (2006.01)
*B29K 105/16* (2006.01)
*B29L 31/30* (2006.01)
*B29C 70/42* (2006.01)
*B64C 3/18* (2006.01)
*B64C 1/00* (2006.01)

(56) References Cited

OTHER PUBLICATIONS

EPO, Extended European Search Report, Appl. No. EP20177039, dated Nov. 9, 2020.

* cited by examiner

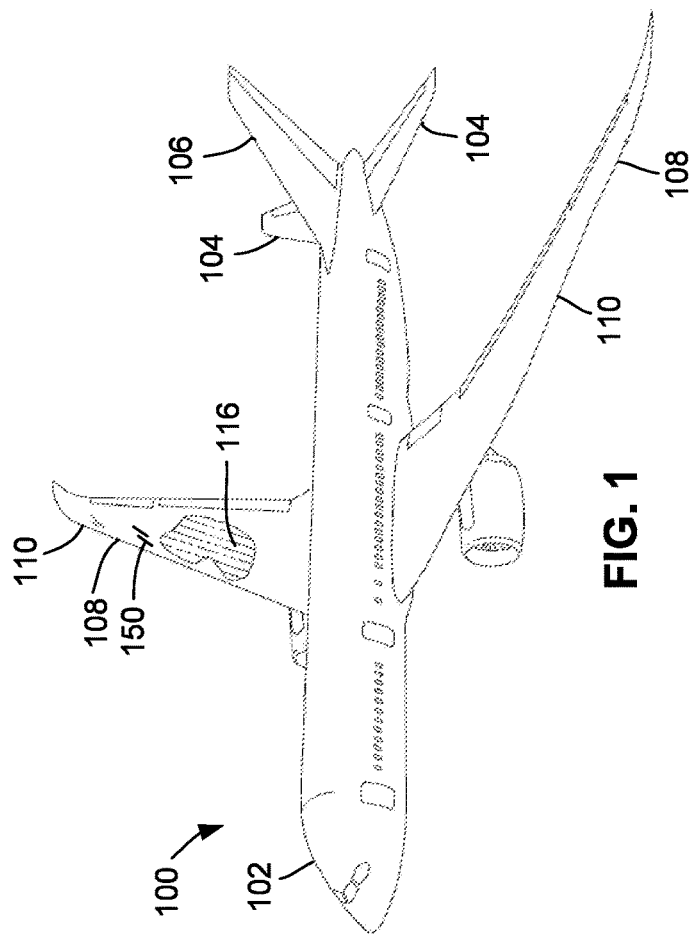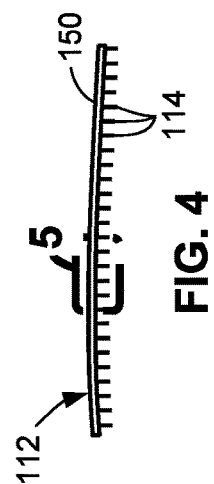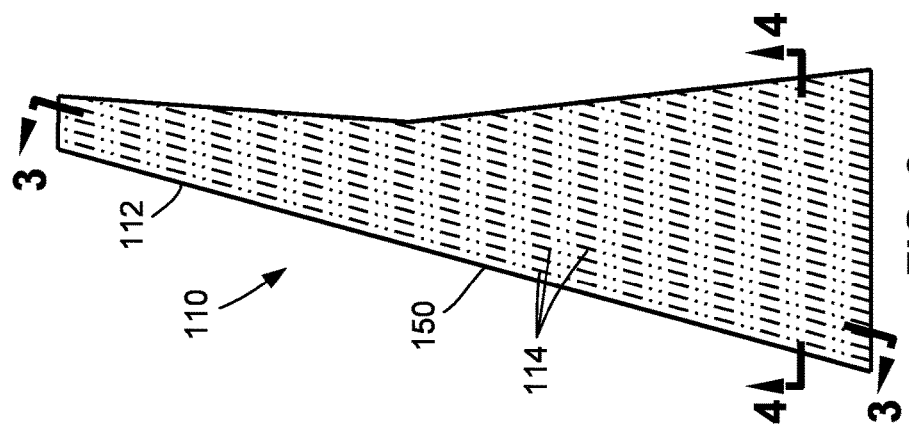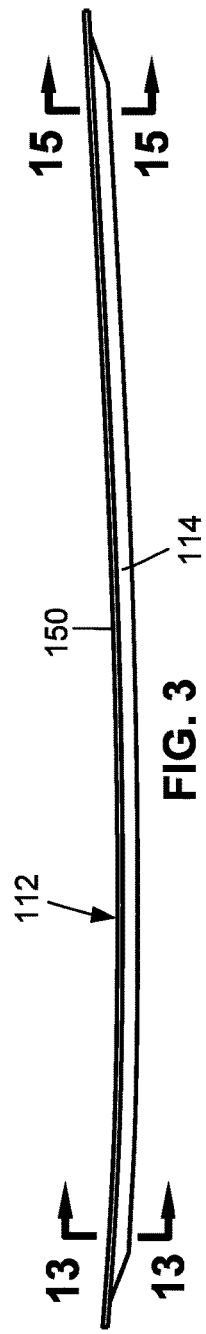
FIG. 1
FIG. 2
FIG. 3
FIG. 4

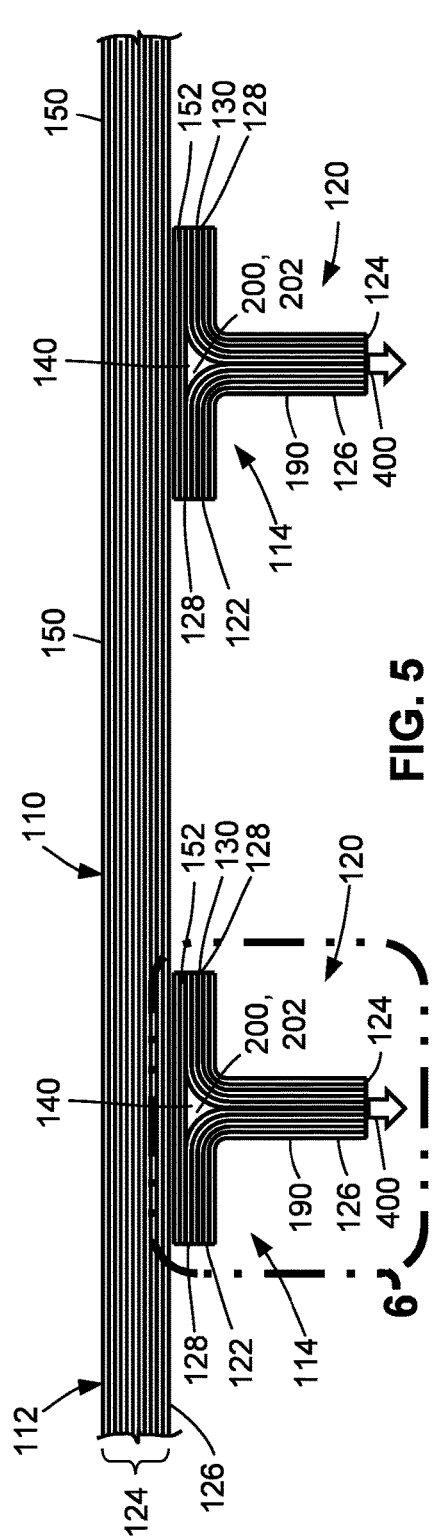
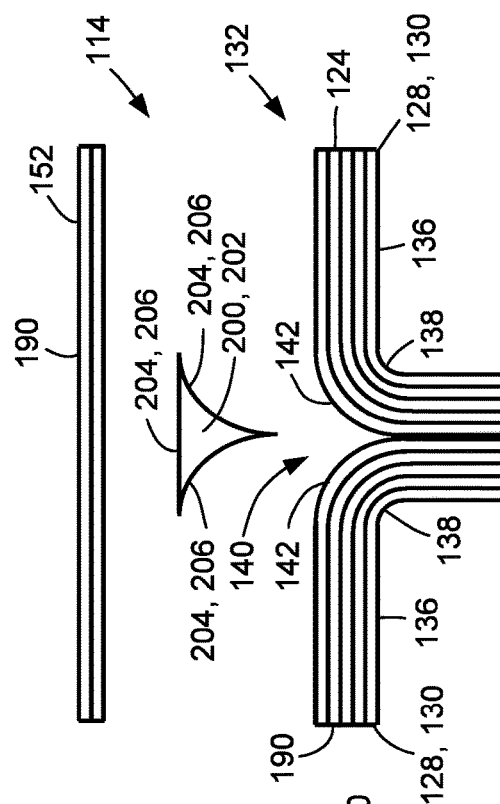
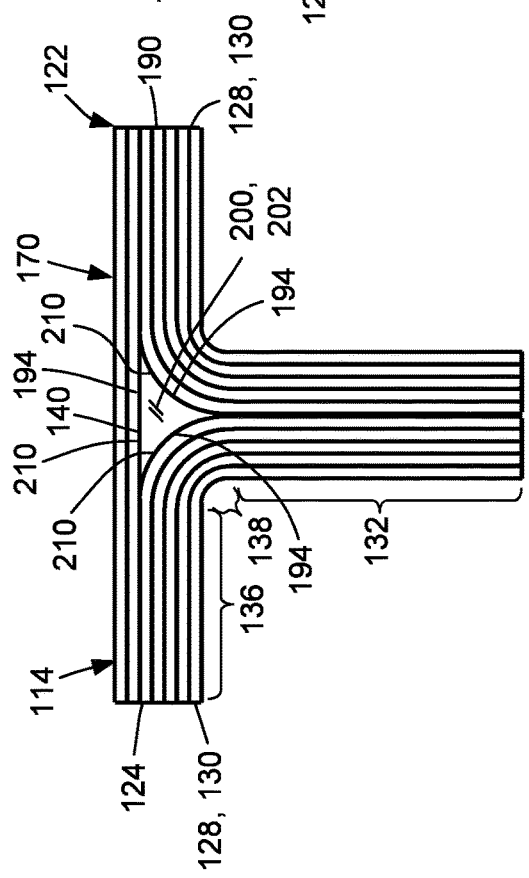
FIG. 5
FIG. 6
FIG. 7

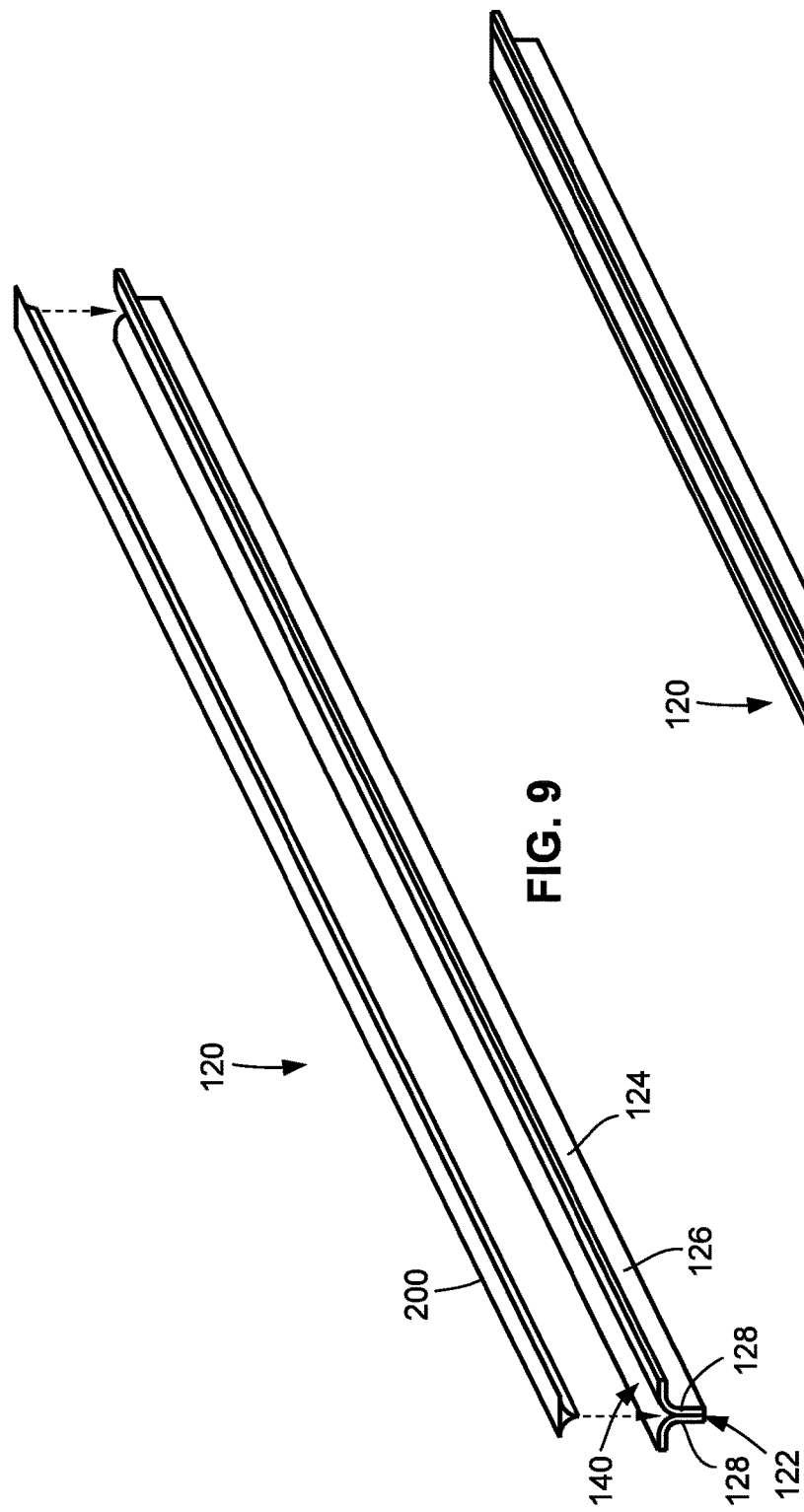

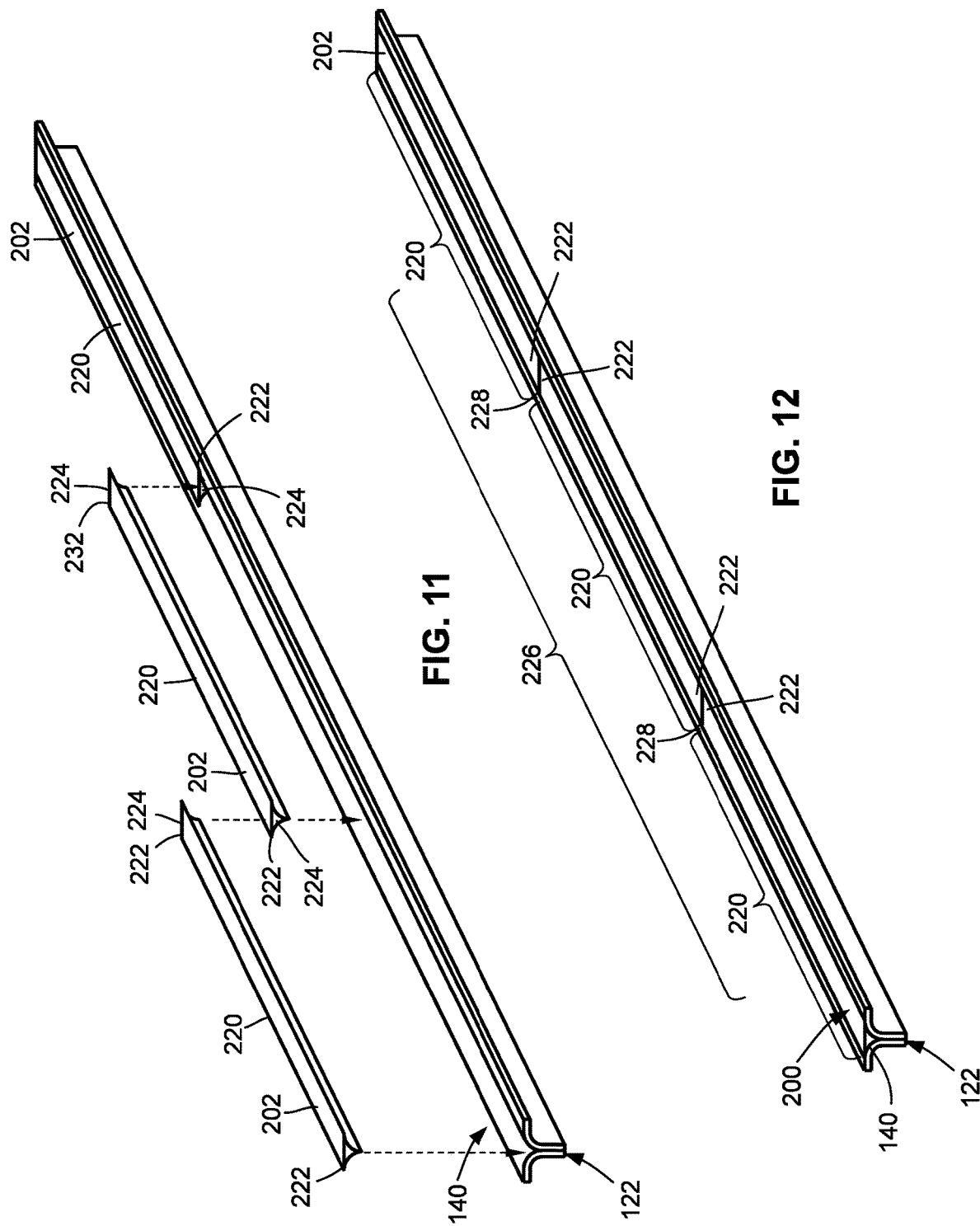

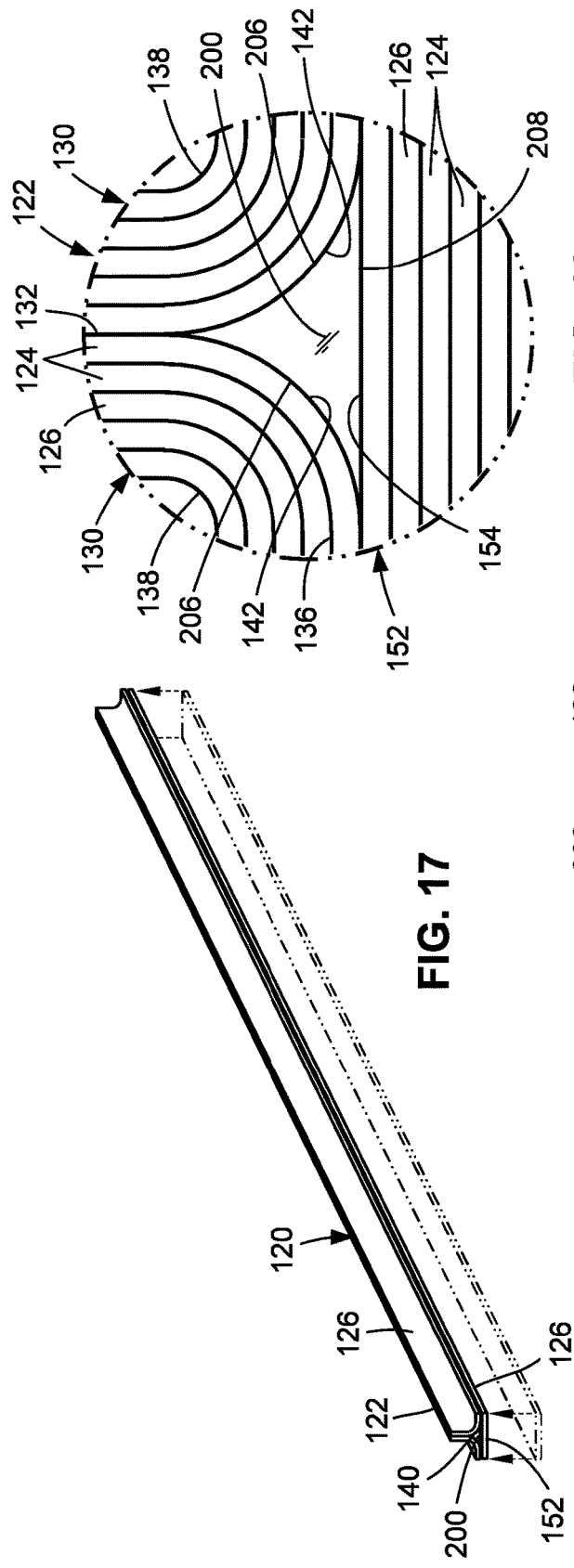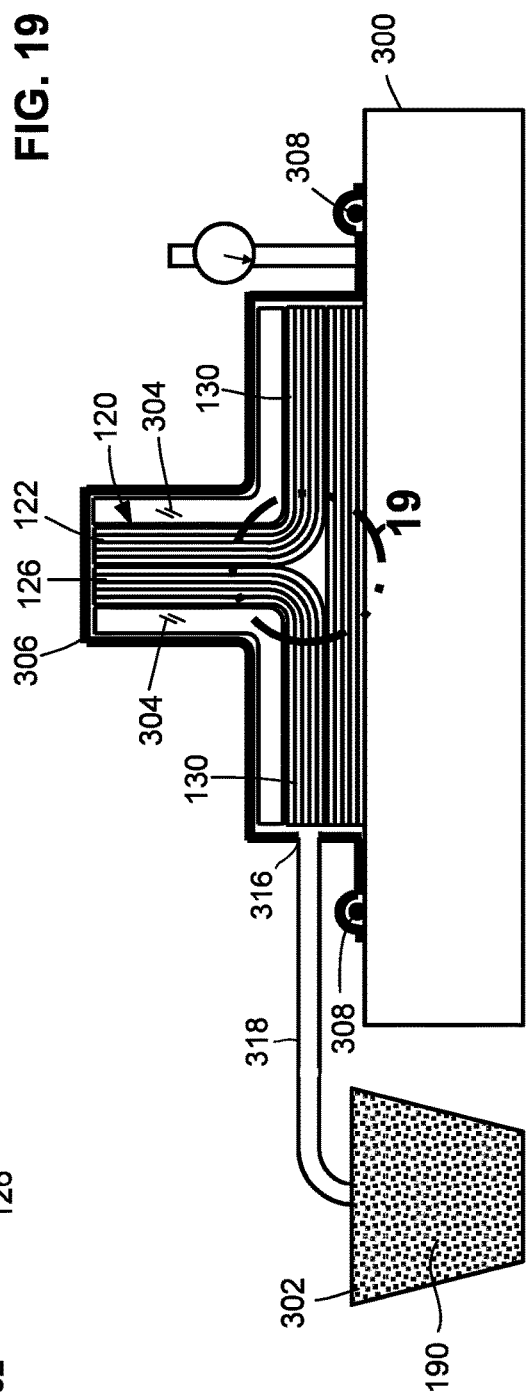
FIG. 17
FIG. 18
FIG. 19

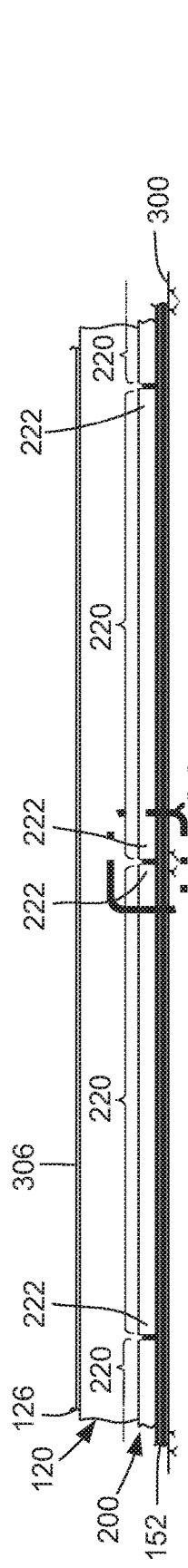
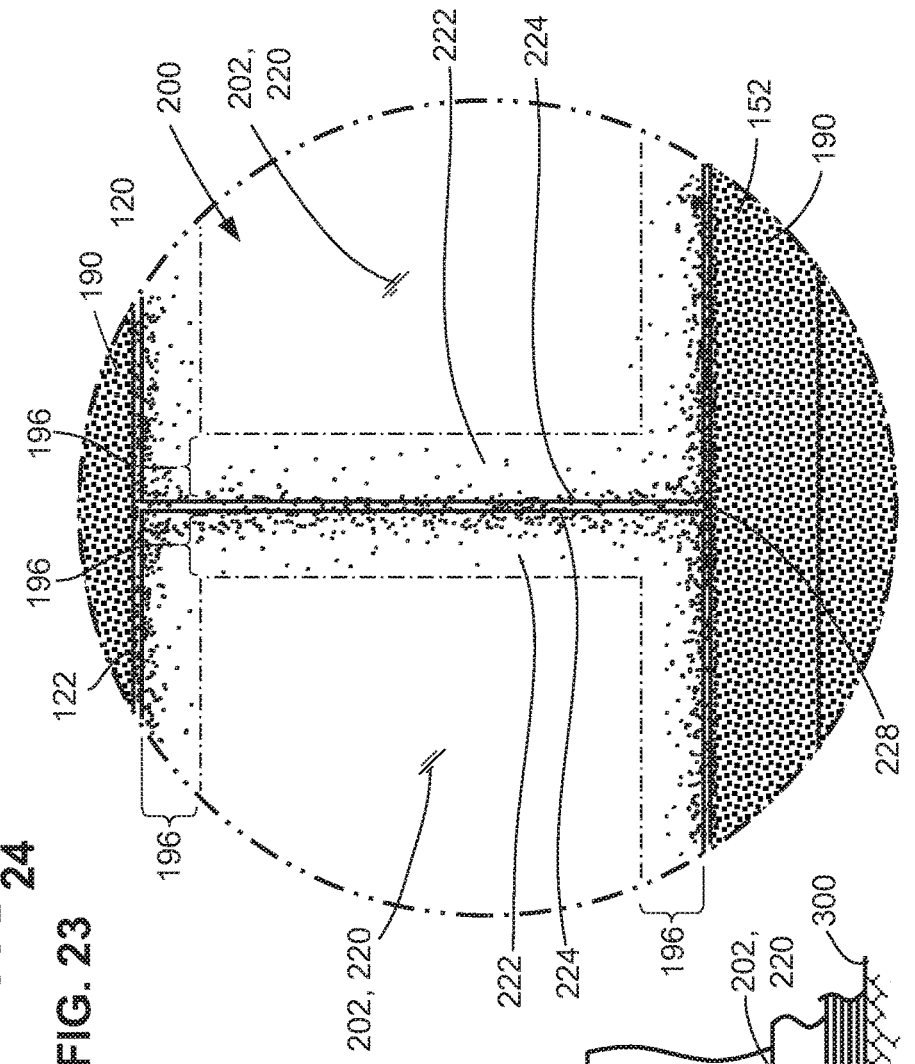
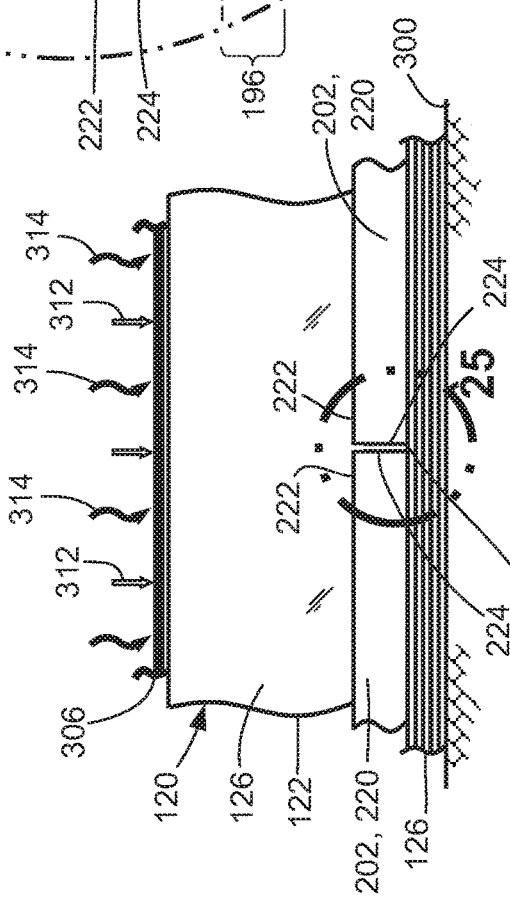
FIG. 23
FIG. 24
FIG. 25

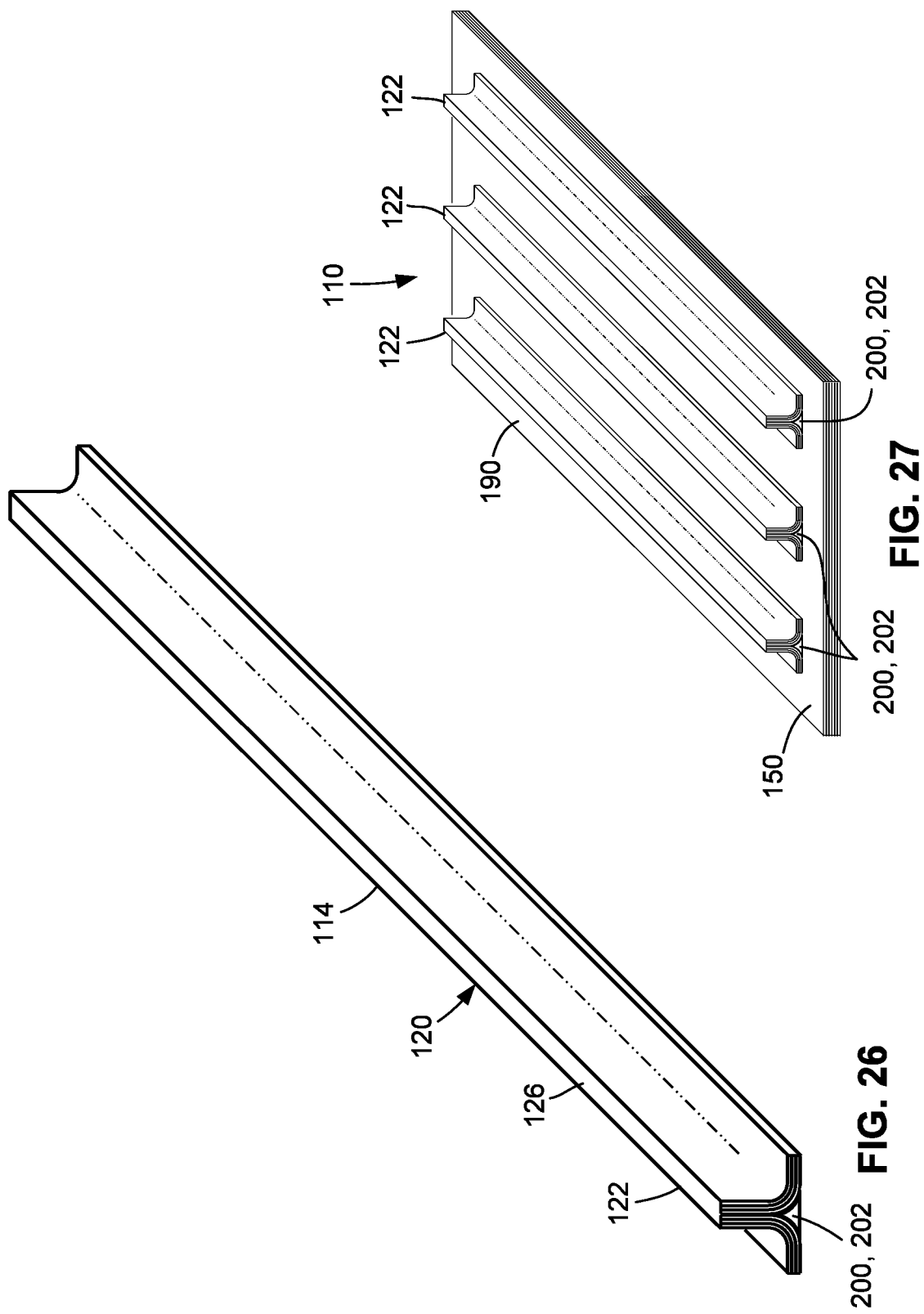

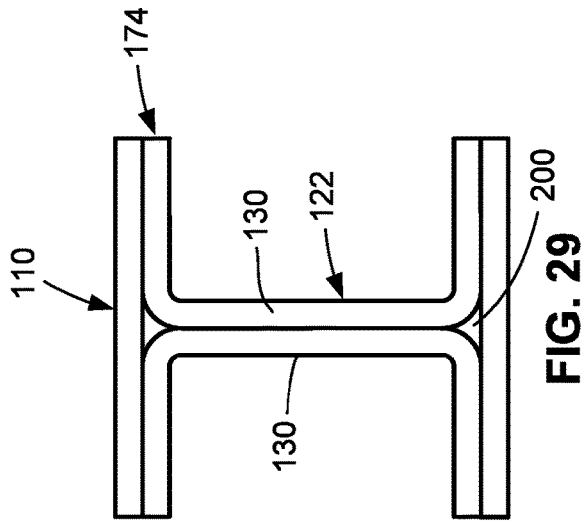
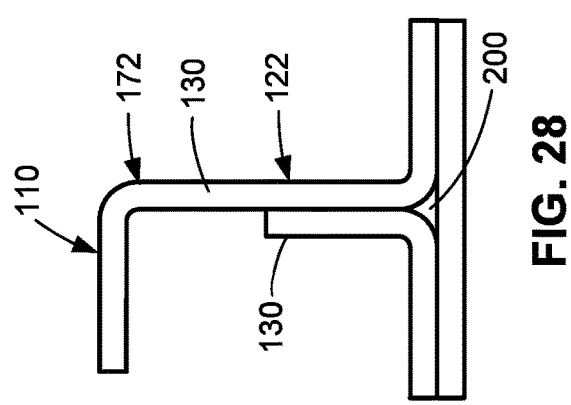
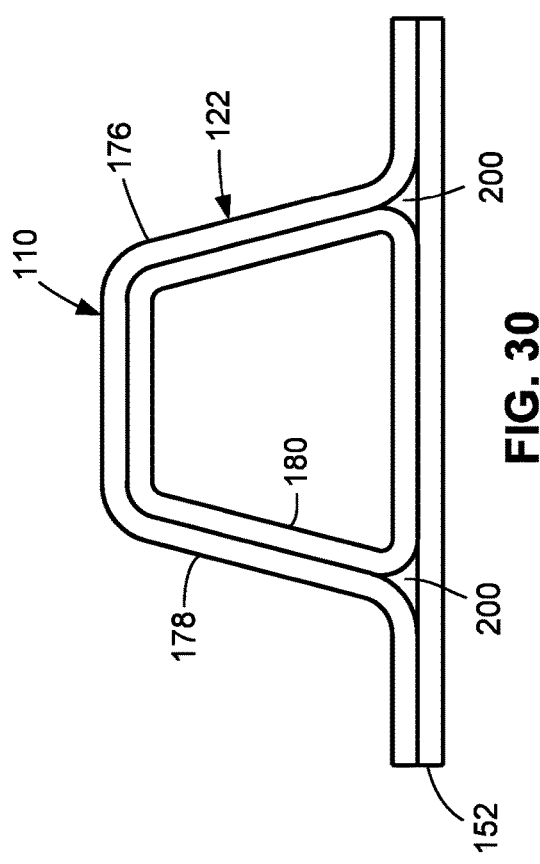

RADIUS FILLER FOR WET COMPOSITE LAYUP

FIELD

The present disclosure relates generally to composites manufacturing and, more particularly, to a composite structure having a thermoplastic or thermosetting radius filler and a method of manufacturing the composite structure.

BACKGROUND

Composite structures are used in a wide variety of applications due to their high strength-to-weight ratio, corrosion resistance, and other favorable properties. In aircraft construction, composites are used in increasing quantities to form the fuselage, wings, and other components. For example, the wings of an aircraft may include composite skin panels reinforced by composite stringers.

Composite stringers may be provided in a variety of cross-sectional shapes. For example, a composite stringer of a wing panel may have a T-shaped cross-section formed by assembling a pair of composite channels (e.g., L-shaped channels) in back-to-back arrangement. Each composite channel includes a flange portion and a web portion joined at a radiused web-flange transition. The web portions of the composite channels are assembled in back-to-back arrangement to form a composite base member, and which results in a lengthwise notch in the composite base member defined by the web-flange transitions of the back-to-back composite channels. The lengthwise notch may be referred to as a radius cavity of the composite stringer. To improve the strength, stiffness, and durability of a composite structure having composite stringers, it is necessary to fill each radius cavity with a radius filler.

Conventional methods of manufacturing and installing radius fillers present several challenges. For example, one method involves laying up individual strips of prepreg composite material (e.g., unidirectional reinforcing fibers pre-impregnated with resin) into the radius cavity of a composite base member. Each strip of prepreg composite material may be cut to a precise width prior to installation as an individual composite ply into the radius cavity. The ply-by-ply installation of individual strips of prepreg composite material is labor-intensive and time-consuming.

Another method of manufacturing radius fillers involves pre-fabricating each radius filler to match the shape of the radius cavity to be filled. Individual strips of prepreg composite material are laid up in stacked formation to form a radius filler on a layup tool prior to installation of the radius filler in the radius cavity. For a radius filler having unidirectional reinforcing fibers, the axial stiffness of the radius filler and the composite base member may be mismatched. For example, the lengthwise orientation of the unidirectional reinforcing fibers in the radius filler results in a high axial stiffness of the radius filler relative to the axial stiffness of the composite base member. The mismatch in axial stiffness between the radius filler and the composite base member may result in undesirable strength characteristics in the cured composite structure. The effects of relatively high axial stiffness of a radius filler may be pronounced at the terminal ends of a composite stringer where reduced axial stiffness is desired.

One approach for reducing the mismatch in axial stiffness of a radius filler relative to a composite base member is to manufacture the radius filler using a laminating machine configured to laminate prepreg composite plies having non-zero degree fiber orientations (e.g., +/−30 degrees) in addition to laminating composite plies having a zero-degree fiber orientation. The ability to lay up individual composite plies with non-zero fiber orientations provides a means for more closely matching the axial stiffness of the radius filler with the axial stiffness of the composite base member. In addition, the composite plies may be laid up such that the axial stiffness of the radius filler is reduced at the terminal ends of the composite stringer. While the above-described manufacturing method is structurally advantageous, laminating machines represent a significant capital expense for construction, operation, and maintenance.

As can be seen, there exists a need in the art for a system and method of manufacturing a composite structure having a radius filler that avoids the above-noted challenges.

SUMMARY

The above-noted needs associated with radius fillers are specifically addressed and alleviated by the present disclosure which provides a method of manufacturing a cured composite structure. The method includes placing a radius filler element into a radius cavity extending along a length of a composite base member formed of dry fiber material comprised of reinforcing fibers. The radius filler element is formed of a radius filler material. The method also includes infusing resin into the dry fiber material, and chemically reacting the resin with the radius filler material to create a mixture of resin and radius filler material along side surface interfaces between the radius filler element and the composite base member. The method additionally includes curing or solidifying the resin, and allowing solvent in the resin to evaporate causing hardening of the mixture and bonding of the radius filler element to the composite base member, and resulting in a cured composite structure.

Also disclosed is cured composite structure having a composite base member comprised of reinforcing fibers embedded in resin and having a radius cavity extending along a length of the composite base member. The cured composite structure also includes a radius filler element extending continuously along a length of the radius cavity and having radius filler side surfaces. The radius filler element is formed of a radius filler material. The cured composite structure additionally includes a mixture zone bonding the radius filler side surfaces to the composite base member. The mixture zone is comprised of a hardened mixture of resin and radius filler material. In one example, the cured composite structure may be a composite stringer or a composite spar of an aircraft.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a perspective view of an aircraft;

FIG. 2 is a top-down view of an example of a cured composite structure configured as a wing panel of an aircraft, the wing panel having a composite skin panel and a plurality of composite stringers;

FIG. 3 is a cross-sectional view of the wing panel taken along line 3-3 of FIG. 2 and illustrating a composite stringer coupled to the composite skin panel;

FIG. 4 is a cross-sectional view of the wing panel taken along line 4-4 of FIG. 2 and illustrating a plurality of composite stringers coupled to the composite skin panel;

FIG. 5 is a magnified view of the portion of the wing panel identified by reference numeral 5 in FIG. 4 and illustrating a continuous radius filler element formed of thermoplastic material and filling the radius cavity of each composite stringer;

FIG. 6 is a magnified view of one of the composite stringers showing the radius filler element contained within the radius cavity;

FIG. 7 is an exploded view of the composite stringer of FIG. 6;

FIG. 9 is an exploded perspective view of an example of a structural assembly having a composite base member formed of dry fiber material and having a radius cavity, and further illustrating a radius filler element formed of radius filler material for installation in the radius cavity;

FIG. 10 is a perspective view of the structural assembly of FIG. 9 showing the radius filler element installed within the radius cavity of the composite base member;

FIG. 11 is a partially exploded perspective view of an example of a composite base member and a plurality of radius filler segments each formed of radius filler material and configured to be inserted into the radius cavity in end-to-end arrangement;

FIG. 12 is a perspective view of the structural assembly of FIG. 11 showing the radius filler segments in end-to end arrangement to form a segment series within the radius cavity of the composite base member;

FIG. 17 is a partially exploded perspective view of a structural assembly comprising a composite strip of dry fiber material positionable on a bottom side of the composite base member for capturing the radius filler element within the radius cavity;

FIG. 18 is a cross-sectional view of the structural assembly of FIG. 17 vacuum bagged to a cure tool;

FIG. 19 is a magnified view of the portion of the structural assembly of FIG. 18 identified by reference numeral 19 and illustrating the radius filler element captured between the composite base member and the composite strip;

FIG. 23 is a side sectional view of the structural assembly of FIG. 18 and illustrating a plurality of radius filler segments in end-to-end arrangement captured between the composite base member and the composite strip;

FIG. 24 is a magnified view of the portion of FIG. 23 identified by reference numeral 24 and illustrating the segment ends of a pair of end-to-end radius filler segments defining an end-to-end interface;

FIG. 25 is a magnified view of the portion of FIG. 24 identified by reference to 25 and illustrating a mixture zone surrounding the segment ends of a pair of the end-to-end radius filler segments and containing a mixture of resin and radius filler material for bonding together the radius filler segments at the end-to-end interface;

FIG. 26 is a perspective view of an example of a structural assembly comprising a composite base member formed of dry fiber material and containing a radius filler element formed of radius filler material;

FIG. 27 is a perspective view of an example of a cured composite structure produced by co-curing or co-bonding a plurality of structural assemblies of FIG. 26 mounted on a composite skin panel;

FIG. 28 is a sectional view of an example of a cured composite structure containing a radius filler element and configured in a J-shaped cross-section;

FIG. 29 is a sectional view of an example of a cured composite structure containing a radius filler element and configured in an I-shaped cross-section;

FIG. 30 is a sectional view of an example of a cured composite structure containing a radius filler element and configured in a hat-shaped cross-section.

DETAILED DESCRIPTION

Figure 8:
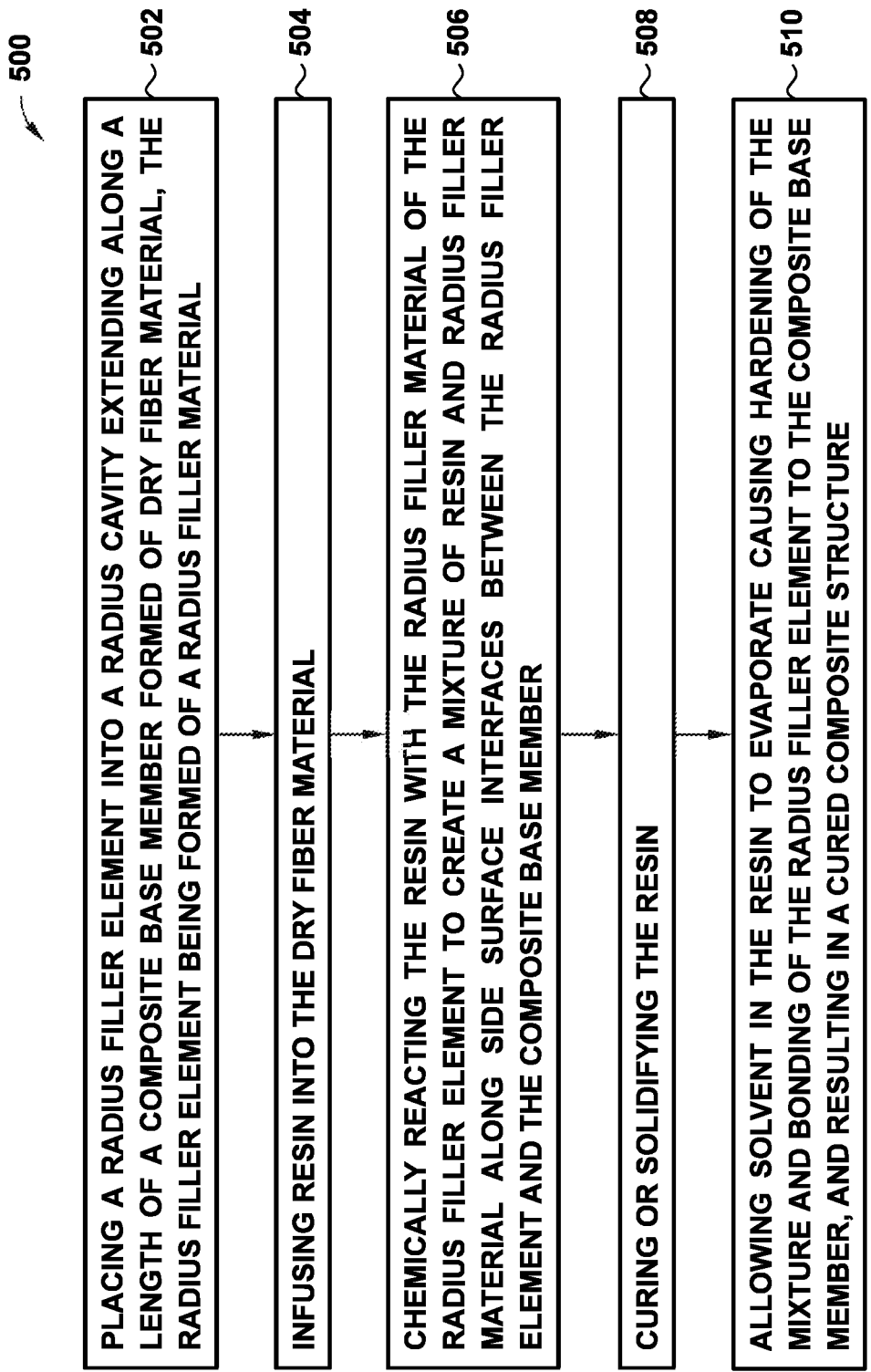
FIG. 8 is a flowchart of operations included in a method of manufacturing a cured composite structure.

Referring now to the drawings which illustrate preferred and various examples of the disclosure, shown in FIG. 1 is a perspective view of an aircraft 100 which may include one or more cured composite structures 110 having a radius filler element 200 (e.g., FIG. 5) formed of radius filler material 202 (e.g., FIG. 5) and manufactured as described below. The aircraft 100 may include a fuselage 102, a horizontal tail 104, a vertical tail 106, and a pair of wings 108, any one or more of which may be cured composite structures 110 manufactured according to one or more aspects of the present disclosure. For example, the aircraft 100 in FIG. 1 may include one or more composite wing spars 116 each configured as a cured composite structure 110. FIG. 2 shows a cured composite structure 110 configured as a wing panel 112 having a composite skin panel 150 and a plurality of composite stringers 114 for stiffening the wing panel 112. FIG. 3 is a spanwise sectional view of the wing panel 112 showing a composite stringer 114 coupled to the composite skin panel 150. FIG. 4 is a chordwise sectional view of the wing panel 112 showing the plurality of composite stringers 114 coupled to the composite skin panel 150.

FIG. 5 is a magnified view of a portion of the wing panel 112 showing the composite stringers 114 coupled to the composite skin panel 150. The composite skin panel 150 may be comprised of composite plies 124 that may be separately laid up on a wing skin layup tool (not shown). As described in greater detail below, each one of the composite stringers 114 includes a composite base member 122 and a radius filler element 200. The composite base member 122 of each composite stringer 114 has a generally V-shaped notch that extends along the length of the composite base member 122. The V-shaped notch may be described as the radius cavity 140 for receiving the radius filler element 200.

In FIG. 5, the composite base member 122 may be comprised of back-to-back composite components 128. In the example shown, each one of the back-to-back composite components 128 is configured as a composite channel 130 having an L-shaped configuration. However, in other examples described below, a composite base member 122 (e.g., FIGS. 28-30) may have composite components 128 having a cross-sectional configuration that is different than the L-shaped configuration shown in FIG. 5. Regardless of the cross-sectional shape, each one of the composite components 128 of a composite base member 122 may be comprised of composite plies 124 of dry fiber material 126 laid up on a base member layup tool (not shown).

Referring still to FIG. 5, the composite base member 122 of each composite stringer 114 includes a composite strip 152 that is assembled over the composite components 128 to encapsulate the radius filler element 200 within the radius cavity 140. As mentioned above, during the manufacturing of the cured composite stringer 114, the composite base member 122 and the composite strip 152 are comprised of composite plies 124 which are each comprised of dry fiber material 126 (e.g., a dry fiber preform). The composite plies 124 may be made up of reinforcing fibers which may be arranged as unidirectional fibers, as woven cloth, or in other fiber arrangements. The combination of the composite base member 122 and the radius filler element 200 in solid form defines an uncured structural assembly 120. As described in greater detail below, resin 190 such as thermosetting resin or thermoplastic resin is infused into the dry fiber material 126 of the structural assembly 120 (e.g., FIGS. 9-10), after which the resin 190 is cured (e.g., for thermosetting resin) or solidified (e.g., for thermoplastic resin) to result in a cured composite stringer 114.

The cured composite structure 110 of FIG. 5 may be produced by performing the resin infusion and curing or solidification process with a plurality of structural assemblies 120 mounted to a composite skin panel 150 laid up with composite plies 124 formed of dry fiber material 126. Alternatively, the cured composite structure 110 of FIG. 5 may be produced by laying up and curing or solidifying the composite skin panel 150 as a separate operation from the laying up and curing or solidifying of the composite stringers 114. For example, the composite skin panel 150 may be produced by laying up and curing or solidifying either prepreg composite plies (i.e., reinforcing fibers pre-impregnated with resin 190) or composite plies 124 formed of dry fiber material 126 that is later infused with resin 190. The composite stringers 114 may be separately produced by laying up, infusing, and curing or solidifying a plurality of uncured structural assemblies 120 (e.g., FIGS. 9-10) to form a corresponding plurality of cured composite stringers 114. The cured composite stringers 114 may be subsequently bonded to the composite skin panel 150. In the present disclosure, the term "cured composite structure" encompasses cured composite structures 110 containing cured thermosetting resin, and also encompasses cured composite structures 110 containing solidified thermoplastic resin. A cured composite structure 110 includes reinforcing fibers embedded in resin 190 and containing at least one radius filler element 200.

Referring to FIGS. 6-7, shown in FIG. 6 is a magnified view of an example of a cured composite stringer 114. FIG. 7 is an exploded view of the composite stringer 114 of FIG. 6 showing the radius cavity 140 containing the radius filler element 200. As mentioned above, a composite base member 122 may be formed of two composite components 128 configured as composite channels 130 arranged in back-to-back relation to each other. In FIGS. 6-7, the composite components 128 (e.g., composite channels 130) each have an L-shaped cross-section which, when assembled, define a T-shaped cross section 170 (e.g., a blade section) of a cured composite structure 110 (e.g., a composite stringer 114). However, as mentioned above, in other examples (e.g., FIG. 28-30), one or more of the composite components 128 of a composite base member 122 may have a C-shaped cross-section, a Z-shaped cross-section, or any one of a variety of alternative cross-sectional shapes. The composite channels 130 of the composite base member 122 may be assembled to form any one of a variety of different cross-sectional shapes such as a J-shaped cross section 172 (FIG. 28), an I-shaped cross section 174 (FIG. 29), or a hat-shaped cross-section (FIG. 30).

Referring still to FIGS. 6-7, each composite component 128 has a web portion 132 and at least one flange portion 136. Each web portion 132 and flange portion 136 are interconnected by a radiused web-flange transition 138. When composite components 128 are assembled in back-to-back relationship, the web-flange transitions 138 of the back-to-back composite components 128 define the above-mentioned radius cavity 140. To improve the strength characteristics of a cured composite structure 110, the radius cavity 140 is filled with a radius filler element 200 in solid form. The radius filler element 200 is formed of either a radius filler thermoplastic material or a radius filler thermosetting material, as described below. The radius cavity 140 has opposing radius cavity surfaces 142. The radius filler element 200 has radius filler side surfaces 204 which include opposing concave surfaces 206 interconnected by a flat surface 208. The concave surfaces 206 of the radius filler element 200 are configured complementary to the radius cavity surfaces 142 of the radius cavity 140. The radius cavity surfaces 142 and the radius filler side surfaces 204 define side surface interfaces 210 between the radius filler element 200 and the composite base member 122.

As mentioned above, the radius filler element 200 is formed of radius filler material 202 which may be homogenous throughout the radius filler element 200. In some examples, the radius filler element 200 may include chopped fibers which may be randomly oriented throughout the radius filler element 200. Alternatively or additionally, the radius filler element 200 may include filler material or other constituents for improving the mechanical properties of the cured composite structure 110. The radius filler element 200 may be devoid of unidirectional reinforcing fibers extending along a lengthwise direction of the radius filler element 200. The absence of unidirectional reinforcing fibers in the radius filler element 200 may reduce the load-carrying capability of the radius filler element 200 including the load-carrying capability along the lengthwise direction. In this regard, the radius filler element 200 may be described as being non-structural in the sense that the radius filler element 200 may have a relatively low or negligible contribution to the axial strength, axial stiffness, and/or bending stiffness of the cured composite structure 110.

As described in greater detail below, during the resin infusion and curing or solidification process, the radius filler element 200 bonds to the composite base member 122 as a result of a chemical reaction that occurs between the resin 190 of the composite base member 122 and the radius filler material 202 of the radius filler element 200. More specifically, the resin 190 includes a solvent 192 (e.g., FIG. 22) that chemically reacts with the radius filler material 202 which is in solid form. In one example, the solvent 192 may chemically melt or partially dissolve a portion of the radius filler material 202 of the radius filler element 200. The chemical reaction between the solvent 192 and the radius filler material 202 results in a mixture 194 (e.g., FIG. 22) of resin 190 and radius filler material 202. The mixture 194 occurs within a mixture zone 196 (FIG. 22) that extends along or proximate the radius filler side surfaces 204 that define the perimeter of the radius filler element 200.

Figure 22:
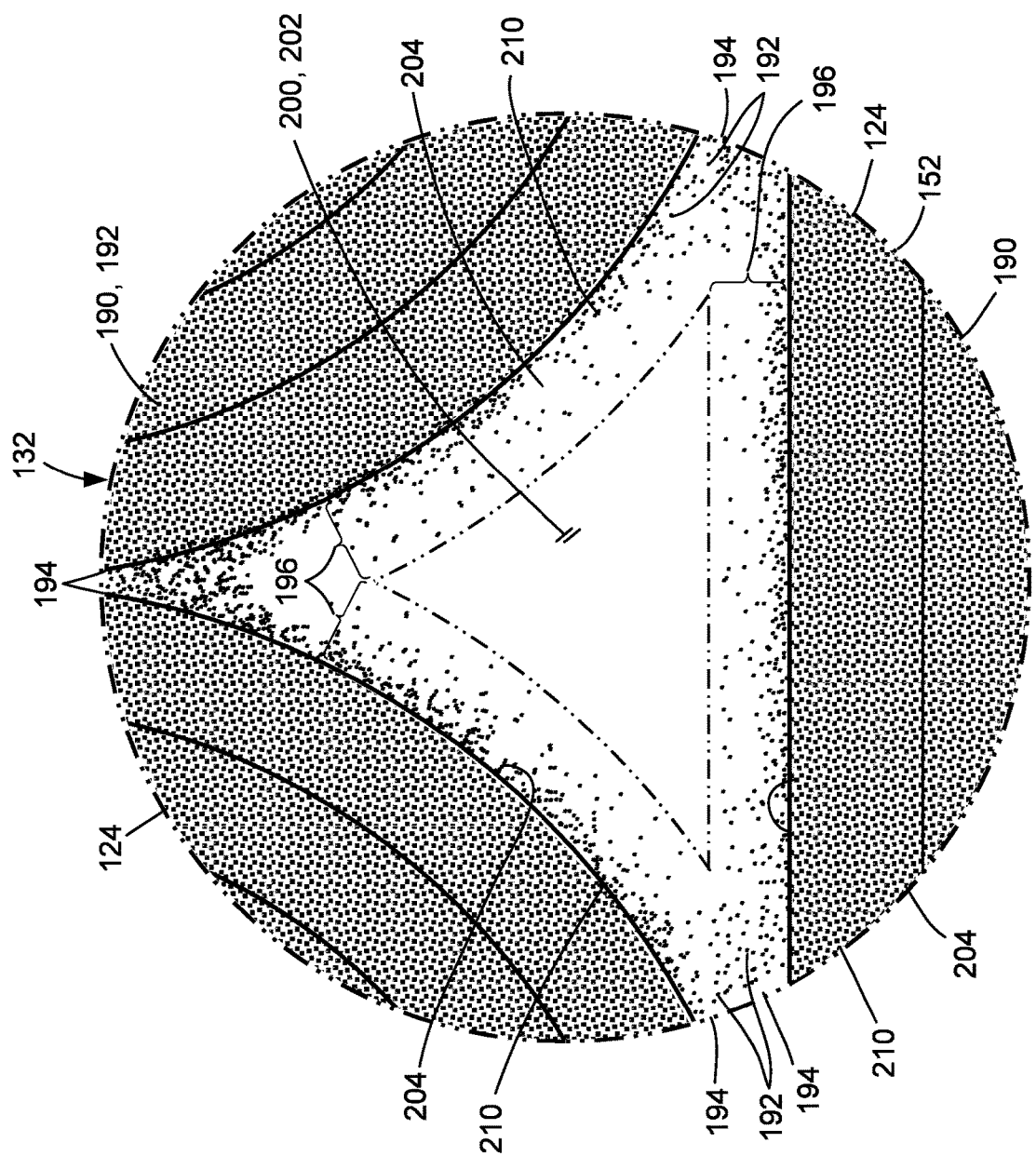
FIG. 22 is a magnified view of the portion of FIG. 21 identified by reference numeral 22 and illustrating a mixture zone surrounding the radius filler element, the mixture zone containing a mixture of resin and radius filler material for bonding the radius filler element to the composite base member and the composite strip.

As described below, during curing or solidifying of the resin 190, the solvent 192 in the resin 190 evaporates causing hardening of the mixture 194 (e.g., FIG. 22) within the mixture zone 196 (e.g., FIG. 22) and which results in the bonding of the radius filler element 200 to the composite base member 122 along the side surface interfaces 210. In this regard, the hardened mixture 194 structurally integrates the radius filler element 200 with the composite base member 122. The mixture zone 196 surrounding the radius filler element 200 may be defined as a bondline at the side surface interfaces 210 between the radius filler element 200 and the composite base member 122. In FIG. 22, the mixture zones 196 are shown at an exaggerated thickness. In this regard, each mixture zone 196 may be thin relative to the overall cross-sectional width and cross-sectional height of the radius filler element 200. For example, for a radius filler element 200 having a width (i.e., of the flat surface 208—FIG. 7) of approximately 0.5 inch and a height of approximately 0.5 inch measured from the flat surface 208 (FIG. 7) to the intersection of the concave surfaces 206 (FIG. 7), the mixture zones 196 along the three radius filler side surfaces 204 (FIG. 7) may each have a thickness of less than 0.10 inch. However, in other examples, each mixture zone 196 may have a thickness of greater than 0.10 inch. The radius filler element 200 and the composite base member 122 may be fused together at the bondline defined by each mixture zone 196. When viewed in cross section (e.g., FIG. 22), the fused bondline defined by each mixture zone 196 may be described as blended and indistinct. The blended nature of the bondlines between the radius filler element 200 and the composite base member 122 significantly reduces or eliminates the propensity for cracks to develop in the bondlines, which significantly improves the strength and durability characteristics of the cured composite structure 110.

As mentioned above, the resin 190 infused into the composite base member 122 may be a thermoplastic resin or a thermosetting resin. Thermoplastic resin infused into the composite base member 122 may comprise any one of a variety of materials including, but not limited to, acrylonitrile butadiene styrene (ABS), acrylic-styrene-acrylonitrile (ASA), polyethylene terephthalate (PET), polyphenylene sulfide (PPS), polylactic acid (PLA), polycarbonate material, polyether ether ketone (PEEK), polyether ketone ketone (PEKK), copolymeric material, acrylics, fluorocarbons, polyamides, polyolefins, polyesters, polycarbonates, polyurethanes, polyetherimides, polyethersulfone, polysulfone, and polyphenylsulfone. Thermosetting resin infused into the composite base member 122 may comprise any one of a variety of materials including, but not limited to, polyurethanes, phenolics, polyimides, sulphonated polymer, a conductive polymer, benzoxazines, bismaleimides, cyanate esters, polyesters, epoxies, and silsesquioxanes. The reinforcing fibers of the composite base member 122 may be formed of polymeric material (e.g., plastic), glass, ceramic material, carbon (e.g., graphite), metallic material, or any combination thereof. A composite base member 122 laid up with composite plies 124 formed of prepreg composite material may be made from any fiber/resin material combination including, but not limited to, fiberglass/epoxy, carbon/epoxy, carbon/bismaleimide, and fiberglass/phenolic.

As described above, the resin 190 that is infused into the composite base member 122 contains a solvent 192 that is configured to chemically react with the radius filler material 202. In one example, the resin 190 may be a polar aprotic solvent such as acetone. As mentioned above, the radius filler material 202 is either a radius filler thermoplastic material or a radius filler thermosetting material. Radius filler thermoplastic material may be provided in any one of a variety of compositions including, but not limited to, acrylonitrile butadiene styrene (ABS), acrylic-styrene-acrylonitrile (ASA), polyethylene terephthalate (PET), polyphenylene sulfide (PPS), polylactic acid (PLA), polycarbonate material, polyether ether ketone (PEEK), polyether ketone ketone (PEKK), copolymeric material. Radius filler thermosetting material may also be provided in any one of a variety of compositions including, but not limited to, polyurethanes, phenolics, polyimides, sulphonated polymer, a conductive polymer, benzoxazines, bismaleimides, cyanate esthers, vinyl esters, polyesters, epoxies, and silsesquioxanes. In an example of radius filler thermoplastic material, the acetone in the resin 190 infused into the composite base member 122 may chemically react with (e.g., chemically melt) ABS thermoplastic material and/or PLA thermoplastic material of the radius filler element 200 to facilitate bonding of the radius filler element 200 to the composite base member 122. In an example of radius filler thermosetting material, the acetone in the resin 190 infused into the composite base member 122 may chemically react with (e.g., chemically melt) polyurethane thermosetting material of the radius filler element 200 to facilitate bonding of the radius filler element 200 to the composite base member 122.

Advantageously, the radius filler material 202 of the radius filler element 200 has a Young's modulus (i.e., modulus of elasticity) that is less than the Young's modulus of the composite base member 122 (e.g., of the cured composite structure) along the axial or lengthwise direction of the radius filler element 200. Alternatively or additionally, the radius filler material 202 has a percent elongation at failure (e.g., along the axial or lengthwise direction) that is higher than the percent elongation at failure of the composite base member 122 of the cured composite structure 110. In the present disclosure, the transverse direction is perpendicular to the axial or lengthwise direction of the radius filler element 200. The radius filler material 202 is softer and/or more ductile than the composite base member 122 of the cured composite structure 110, and which may result in the radius filler element 200 being less prone to cracking, as described below.

By forming the radius filler element 200 from radius filler material 202 having a Young's modulus that is lower than the Young's modulus of the composite base member 122, the cured composite structure 110 (e.g., FIG. 5) may deform (e.g., stretch) significantly in the direction of a load (e.g., along the lengthwise direction) without failure of the radius filler element 200. A failure of the radius filler element 200 may include microcracking which may compromise the structural integrity of a composite structure when loaded. In addition, such microcracking of the radius filler element 200 may propagate to the side surface interfaces 210 (e.g., FIG. 7) between the radius filler element 200 and the composite base member 122. Loading of a cured composite structure 110 may include loads applied to the cured composite structure 110 when placed in service. In the example of a composite wing panel 112 (FIGS. 1-2 of an aircraft 100 (FIG. 1), such loads may include flight loads imposed on the composite wing panel 112. Alternatively or additionally, loading of a cured composite structure 110 may occur due to differential shrinkage of the radius filler material 202 relative to the composite base member 122 during curing (e.g., chemical shrinkage) and/or during cool-down (e.g., thermal shrinkage) as the cured composite structure 110 cools from an elevated cure temperature (e.g., for thermosetting resin) or solidification temperature (e.g., for thermoplastic resin) down to room temperature. Loading of the cured composite structure 110 may also occur due to differential thermal expansion or contraction of the radius filler material 202 relative to the composite base member 122 of the cured composite structure 110 when in service. In the example of an aircraft 100, thermal expansion or contraction may occur as a result of changes in ambient air temperature such as may occur when the aircraft 100 on the ground (e.g., up to 100° F.) climbs to a cruising altitudes with a lower ambient air temperature (e.g., down to −70° F.).

In a composite structure, cracking along the side surface interfaces 210 may compromise the load-carrying capability of the composite structure. For example, cracking at the side surface interfaces 210 may compromise the ability of the composite structure to withstand a pulloff load 400 (FIG. 5) exerted by the composite stringers 114 on a composite skin panel 150. As shown in FIG. 5, pulloff loads 400 may be oriented perpendicular to the plane of the composite skin panel 150 and may urge the composite base member 122 away from the composite skin panel 150 with a tendency to separate or de-bond the composite base member 122 from the composite skin panel 150. Advantageously in the present disclosure, forming the radius filler element 200 from radius filler material 202 having a Young's modulus that is lower than the Young's modulus of the composite base member 122 allows a cured composite structure 110 (e.g., FIG. 5) to strain significantly without the radius filler element 200 carrying some of the load. In this regard, the presently-disclosed radius filler element 200 has a reduced risk of cracking which thereby improves the strength and durability of the cured composite structure 110. Although in some examples the radius filler element 200 may be devoid of unidirectional reinforcing fibers (not shown), in other examples, a radius filler element 200 may include unidirectional reinforcing fibers if such reinforcing fibers result in the radius filler element 200 having a Young's modulus that is relatively closely matched (e.g., within 10%) to the Young's modulus of the composite base member 122 of the cured composite structure 110. For example, a radius filler element 200 may include unidirectional reinforcing fibers formed of glass which have a Young's modulus that is lower than the Young's modulus of carbon fibers in the composite base member 122.

As an alternative to or in addition to the above-described Young's modulus relationship, the radius filler element 200 may be described as having a percent elongation at failure (e.g., in the lengthwise direction) that is greater than the percent elongation at failure of the composite base member 122. Percent elongation at failure may be defined as the percentage increase in length (i.e., from its original length) of a component (not shown) at the breaking point, and is a measure of the ability of the component to stretch prior to breaking. In the present disclosure, a high percent elongation at failure of the radius filler element 200 relative to that of the composite base member 122 represents a reduced axial stiffness of the radius filler element 200 relative to the axial stiffness of the composite base member 122. In the context of composite stringers 114 coupled to a composite skin panel 150 as shown in FIG. 5, a relatively high percent elongation at failure of the radius filler element 200 means that the composite stringers 114 may axially strain a significant amount without the risk of failure (e.g., cracking) of the radius filler elements 200. In addition, the presently-disclosed radius filler element 200 allows for reduced axial stiffness at the terminal ends of the composite stringers 114 which reduces or prevents the occurrence of stress concentrations in the composite skin panel 150 at the location of the terminal ends of the composite stringers 114. Furthermore, a cured composite structure 110 (e.g., a composite stringer 114) having a radius filler element 200 formed of radius filler material 202 may be lighter in weight than a comparable composite structure having a conventional radius filler formed of laminated carbon-epoxy composite plies (not shown).

FIG. 8 is a flowchart of operations included in a method 500 of manufacturing a cured composite structure 110 (e.g., FIG. 5). The method 500 is described in the context of manufacturing a composite stringer 114 (e.g., FIG. 5). However, the method 500 may also be implemented for manufacturing cured composite structures 110 of any one of a variety of sizes, shapes, and configurations. In one example, the method 500 may be implemented for manufacturing a wing panel 112 (e.g., FIG. 5) having a plurality of composite stringers 114.

Referring to FIGS. 9-12, step 502 of the method 500 includes placing a radius filler element 200 into a radius cavity 140 extending along a length of a composite base member 122 formed of dry fiber material 126 comprised of reinforcing fibers. As mentioned above, the composite base member 122 is formed of one or more layers or composite plies 124 of dry fiber material 126. Each of the composite plies 124 (e.g., FIGS. 5-7) of dry fiber material 126 is made up of reinforcing fibers which may be in woven form (e.g., 90 degree woven), braided form, non-woven mat or cloth, or the reinforcing fibers may be provided in a unidirectional arrangement in which the reinforcing fibers are parallel to each other. The reinforcing fibers and/or the composite plies 124 of a composite base member 122 may be held together prior to and/or during the infusion of resin 190. For example, the reinforcing fibers of a composite base member 122 may be stitched, stapled, or tacked (e.g., with tackifier) together and layered and/or arranged in side-by-side relation to each other. Although not shown, in some examples, a composite base member 122 may include a thin mesh or veil (not shown) of adhesive on top of or within one or more of the layers or composite plies 124 of dry fiber material 126. Such thin mesh or veil of adhesive may prevent the layers or composite plies 124 of the composite base member 122 from shifting during layup and resin infusion.

Referring to FIGS. 9-10, shown in FIG. 9 is an exploded perspective view of an example of a structural assembly 120 having a composite base member 122 comprised of back-to-back composite components 128 configured as L-shaped channels each formed of dry fiber material 126 and having a radius cavity 140 as described above. Also shown is the radius filler element 200 which is made up of radius filler material 202 in solid form for installation in the radius cavity 140. As described above, the radius filler material 202 is in solid form and is comprised of either solidified radius filler thermoplastic material or cured radius filler thermosetting material. In the example shown, the radius filler element 200 is a continuous radius filler element 200 that extends continuously along the length of the composite base member 122. FIG. 10 is an assembled view of the structural assembly 120 of FIG. 9 showing the radius filler element 200 installed within the radius cavity 140 of the composite base member 122.

Referring to FIGS. 11-12, in some examples, step 502 of inserting the radius filler element 200 into the radius cavity 140 may comprise inserting a plurality of radius filler segments 220 into the radius cavity 140. FIG. 11 shows an example of a composite base member 122 and a plurality of radius filler segments 220 each formed of radius filler material 202 and configured to be inserted into a radius cavity 140 in end-to end arrangement. FIG. 12 is an assembled view of the structural assembly 120 of FIG. 11 showing the radius filler segments 220 in end-to end arrangement to form a segment series 226 within the radius cavity 140 of the composite base member 122. Although FIGS. 11-12 show three (3) radius filler segments 220 for installation into the radius cavity 140, any number of radius filler segments 220 may be installed in end-to-end relation within the radius cavity 140. The length of the individual radius filler segments 220 may be based upon practicalities associated with the manufacturing, handling, and/or installation of the radius filler segments 220. In one example, the radius filler segments 220 may each be provided in a length of 3-15 feet to allow for manual handling and installation of the individual radius filler segments 220 into the radius cavity 140. However, one or more of the radius filler segments 220 may be provided in a length shorter than 3 feet or longer than 15 feet. The length of the individual radius filler segments 220 may be based in part upon the total length of the composite base member 122 which, in some examples (e.g., a composite wing panel 112), may exceed 100 feet in length.

In FIGS. 11-12, the radius filler segments 220 may be inserted into the radius cavity 140 such that the end surfaces 224 are in close proximity to each other. For example, the radius filler segments 220 may be arranged in the radius cavity 140 to result in relatively small gaps (e.g., less than 0.010 inch) between the segment ends 222 of the end-to-end pairs of radius filler segments 220. Alternatively, the radius filler segments 220 may be inserted into the radius cavity 140 such that the segment ends 222 are in abutting contact with each other. Regardless of whether gaps exist or the segment ends 222 are in abutting contact, the opposing segment ends 222 define an end-to-end interface 228 (e.g., FIG. 11) between adjacent pairs of radius filler segments 220. As described in greater detail below, the solvent 192 in the resin 190 (e.g., FIG. 5) that is infused into the composite base member 122 chemically reacts with the radius filler material 202 at the end surfaces 224, forming a mixture 194 (e.g., FIG. 25) of resin 190 and radius filler material 202 at the end-to-end interface 228 between each adjacent pair of radius filler segments 220. Evaporation of the solvent 192 in the mixture 194 and the subsequent hardening of the resin 190 may fuse together the segment ends 222 of adjacent pairs of radius filler segments 220 and resulting in the end-to-end radius filler segments 220 defining a continuous radius filler element 200.

In an example not shown, the segment ends 222 of the radius filler segments 220 may include interlocking features for interconnecting the segment ends 222 of end-to-end pairs of radius filler segments 220. For example, the insertion of a radius filler segment 220 into the radius cavity 140 may include engaging the interlocking feature on the segment ends 222 of one radius filler segment 220 with the interlocking feature on the segment end 222 of another radius filler segment 220 previously installed in the radius cavity 140. The interlocking of the segment ends 222 may ensure that the end surfaces 224 of opposing pairs of end-to-end radius filler segments 220 contact each other to improve the fusing together provided by the chemical reaction of the resin 190 with the radius filler material 202 at the segment ends 222. Advantageously, the interlocking features may also prevent lengthwise shifting of the positions of the radius filler segments 220 relative to each other within the radius cavity 140 during resin infusion. In one example, the interlocking features may be provided in a dovetail configuration. For example, the segment end 222 of one radius filler segment 220 may include a protruding tab (not shown) having a dovetail configuration configured to nest within a pocket or recess (not shown) formed in a dovetail configuration in the segment end 222 of an adjacent radius filler segment 220. However, the interlocking features may be provided in any one a variety of alternative shapes and configurations, without limitation.

The method 500 may include manufacturing the radius filler element 200 or radius filler segments 220 via machining, three-dimensional printing, die extrusion, injection molding, and/or any one of a variety of other manufacturing techniques. Three-dimensional printing may include additive manufacturing of a radius filler element 200 or a plurality of radius filler segments 220 such as by stereolithography, selective laser sintering, fused filament fabrication, or other additive manufacturing techniques. Advantageously, three-dimensional printing and/or injection molding allows for manufacturing of a radius filler element 200 or a plurality of radius filler segments 220 to closely match the cross-sectional shape and size defined in an engineering model (e.g., computer-aided-design model) of the radius cavity 140.

Figure 15:
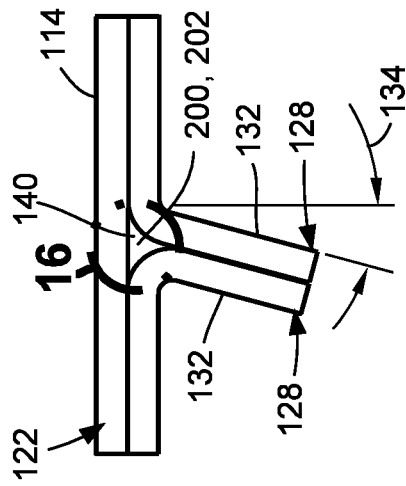
FIG. 15 is a cross-sectional view of an example of a composite stringer taken along line 15-15 of FIG. 3 and illustrating the web portions oriented at a web angle that is non-perpendicular to the flange portions.
Figure 16:
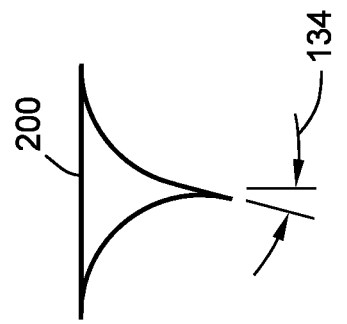
FIG. 16 is a magnified view of the radius filler element of FIG. 15.
Figure 13:
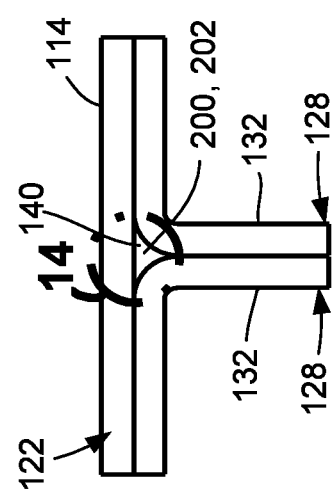
FIG. 13 is a cross-sectional view of an example of a composite stringer taken along line 13-13 of FIG. 3 and illustrating back-to-back composite channels each having a web portion oriented perpendicular to a flange portion.
Figure 14:
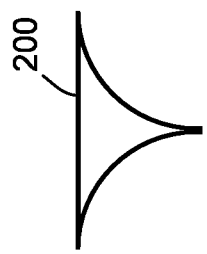
FIG. 14 is a magnified view of the radius filler element of FIG. 13.

Referring to FIGS. 13-16, shown is an example of a composite base member 122 and radius filler element 200 in which the cross-sectional shape is different at different locations along the lengthwise direction of the composite base member 122. FIG. 13 is a cross-sectional view of an example of a composite stringer 114 having back-to-back composite components 128 each including a web portion 132 oriented perpendicular to the flange portion 136. FIG. 14 is a magnified view of the radius filler element 200 of FIG. 13. FIG. 15 is a cross-sectional view of the same composite stringer 114 at a different lengthwise location illustrating the web portions 132 of the composite base member 122 oriented at a local web angle 134 that is non-perpendicular to the flange portions 136. FIG. 16 is a magnified view showing the cross-sectional shape of the radius filler element 200 which is different than the cross-sectional shape of the radius filler element 200 in FIG. 14. In the present example in which the radius cavity 140 has a cross-sectional shape that is different at two or more locations along the length of the composite base member 122 as shown in FIGS. 13-15, the method 500 of manufacturing the radius filler element 200 may include manufacturing the radius filler element 200 with a cross-sectional shape that is complementary to the cross-sectional shape of the radius cavity 140. For example, the radius filler element 200 may be manufactured to match the changing web angle of the web portion 132 of the composite base member 122. In some examples, the variation in cross-sectional shape (e.g., changes in local web angle 134) along the length of the radius cavity 140 may be small enough to allow the use of a radius filler element 200 that has a substantially constant cross-sectional shape. In such case, the radius filler element 200 may be manufactured to have a constant-cross-sectional shape such as by using a die extrusion process.

In addition to manufacturing the radius filler element 200 to match the cross-sectional shape of the radius cavity 140, the method may also include manufacturing the radius filler element 200 to match the cross-sectional size or cross-sectional area of the radius cavity 140 such that the total volume of the radius filler element 200 is substantially equivalent to the volume of the radius cavity 140 after curing of the composite base member 122. In some examples, the radius filler element 200 may be manufactured in a cross-sectional size and/or shape that accounts for resin shrinkage (e.g., cure shrinkage) of the composite base member 122. Alternatively, for some examples in which the cross-sectional shape and cross-sectional size of the radius cavity 140 is substantially constant along the lengthwise direction of the composite base member 122, the radius filler element 200 may be manufactured to have a cross-sectional area that varies (e.g., tapers or reduces) along the lengthwise direction of the composite base member 122 as a means to increase the relative size of the mixture zone 196 (FIG. 20) bonding the radius filler element 200 to the composite base member 122 along the lengthwise direction of the cured composite structure 110. Alternatively or additionally, the cross-sectional area of the radius filler element 200 may be varied or may be substantially constant along the length of the cured composite structure 110, and the cross-sectional area of the mixture zone 196 may vary in a manner such that the percentage of the cross-sectional area of the radius filler element 200 to the cross-sectional area of the mixture zone 196 varies along the lengthwise direction of the cured composite structure 110. In this regard, the mixture zone 196 bonding the radius filler element 200 to the composite base member 122 may vary in relation to the cross-sectional area of the radius filler element 200 along the lengthwise direction.

Advantageously, the radius filler material 202 is formed of solidified radius filler thermoplastic material or cured radius filler thermosetting material and is therefore relatively insensitive to out-time and temperature, unlike prepreg thermosetting materials (e.g., uncured prepreg composite plies) which may require storage at relatively cold temperatures to prevent premature curing of the prepreg thermosetting material prior to layup and final cure. In view of the insensitivity of the radius filler material 202 to out-time and temperature, the manufacturing of the radius filler element 200 or radius filler segments 220 may be performed off-site and in advance of the need for assembly with a composite base member 122 at a production facility. As known in the art, the out-time of thermosetting composite prepreg may be described as the amount of time that the composite prepreg material may be taken out of cold storage and exposed to ambient temperature and which typically reduces the shelf life of the composite prepreg. A further advantage provided by forming the radius filler element 200 of radius filler material 202 is the ability to manufacture the radius filler element 200 as a plurality of radius filler segments 220 having relatively short lengths as described above. The ability to manufacture the radius filler segments 220 in short lengths may be conducive to manufacturing the radius filler segments 220 off-site and then shipping the radius filler segments 220 to the production facility, thereby saving valuable floor space and eliminating equipment costs associated with on-site equipment for manufacturing radius filler segments 220.

Referring briefly FIG. 17, shown is an example of an uncured structural assembly 120 comprised of a composite base member 122 in the form of back-to-back composite channels 130. In addition, the uncured structural assembly 120 includes a radius filler element 200 filling the radius cavity 140 of the composite base member 122, and a composite strip 152 for enclosing the radius filler element 200 within the radius cavity 140 of the composite base member 122. As mentioned above, the composite base member 122 and the composite strip 152 are formed of dry fiber material 126. In an example not shown, as an alternative to a composite strip 152, the uncured structural assembly 120 may include a composite skin panel 150 (e.g., FIG. 27) to which a plurality of composite base members 122 and corresponding radius filler elements 200 may be coupled. The composite skin panel 150 may be laid up using dry fiber material 126 as described above.

Figure 20:
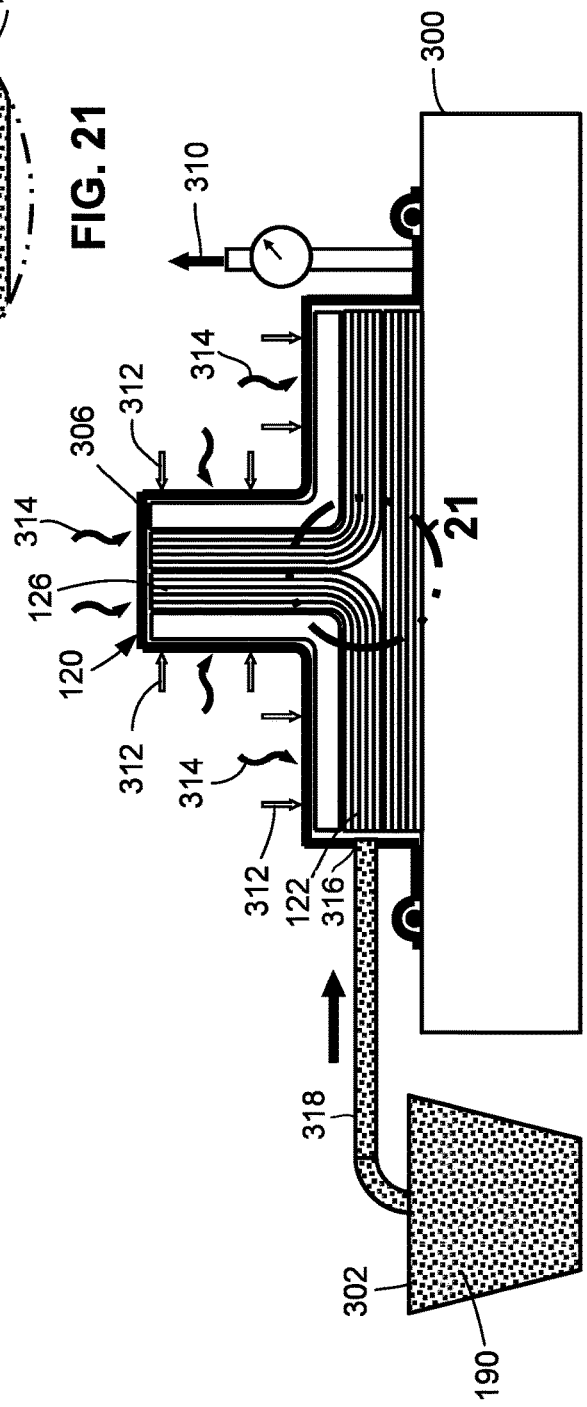
FIG. 20 is a cross-sectional view of the structural assembly of FIG. 18 during the infusion of resin into the dry fiber material of the composite base member and illustrating the application of heat and pressure for curing the structural assembly.

Referring to FIGS. 18-20, step 504 of the method 500 includes infusing resin 190 into the dry fiber material 126 of the composite base member 122. FIG. 18 shows the structural assembly 120 of FIG. 17 vacuum bagged to a cure tool 300 prior to resin infusion using vacuum-assisted resin transfer molding (VARTM). The arrangement may include one or more caul plates 304 that may optionally be positioned on the composite base member 122 for applying uniform compaction pressure 312 (e.g., FIG. 20) on the composite base member 122. For example, FIG. 18 shows a pair of L-shaped caul plates 304 respectively positioned on the composite channels 130 of the composite base member 122. The vacuum bag 306 and one or more processing layers (e.g., a breather layer, a release layer—not shown) may be placed over the caul plates 304 and structural assembly 120 to facilitate resin infusion and curing (e.g., for thermosetting resin) or solidification (e.g., for thermoplastic resin) of the composite base member 122. The perimeter of the vacuum bag 306 may be sealed to the cure tool 300 using an edge seal 308 such as tape sealant or tacky tape. Vacuum fittings (not shown) may be coupled to the vacuum bag 306 and may be fluidly connected to a vacuum source 310 such as a vacuum pump (not shown). One or more infusion ports 316 may also be coupled to the vacuum bag 306 for attaching a corresponding quantity of infusion conduits 318 fluidly connected to a resin container 302 containing resin 190 for vacuum-assisted infusion into the composite base member 122. Although not shown, the arrangement of FIG. 18 may be positioned in an autoclave for resin infusion and curing or solidification of the structural assembly 120. In other examples, the structural assembly 120 may be infused and cured or solidified in an out-of-autoclave process.

FIG. 19 is a magnified view of the radius filler element 200 encapsulated by the surrounding structure of the composite base member 122 of FIG. 18. More specifically, the radius filler element 200 is captured between the one or more composite plies 124 of dry fiber material 126 of the composite channels 130 and the composite strip 152. As described above, each composite channel 130 has a web-flange transition 138 interconnecting the web portion 132 and the flange portion 136 of the composite channel 130. As shown in FIG. 19, the concave surface 206 on each side of the radius filler element 200 is shaped complementary to the radius cavity surface 142 of the web-flange transition 138. The radius filler element 200 may have a cross-sectional size and shape such that the concave surfaces 206 are in intimate contacting relation respectively with the radius cavity surfaces 142 of the web-flange transitions 138 of the composite channels 130. In other examples not shown, a relatively small gap (e.g., less than 0.010 inch) may exist between one or both of the concave surfaces 206 and a corresponding one of the web-flange transitions 138 prior to resin infusion. The flat surface 208 of the radius filler element 200 may also be in intimate contacting relation with the panel surface 154 of the composite strip 152 or composite panel (not shown). Alternatively, a small gap (e.g., less than 0.010 inch—not shown) may exist between the flat surface 208 of the radius filler element 200 and the panel surface 154 of the composite strip 152 or a composite panel prior to resin infusion.

FIG. 20 is a cross-sectional view of the structural assembly 120 showing the application of vacuum pressure on the vacuum bag 306 via the vacuum source 310 for applying compaction pressure 312 to the structural assembly 120 against the cure tool 300. Also shown is the vacuum-assisted drawing of the resin 190 from the resin container 302 into the structural assembly 120 for infusion of resin 190 into the dry fiber material 126 of the composite base member 122. The resin 190 may be infused until wetout of the dry fiber material 126 is achieved and the resin 190 is substantially uniformly distributed throughout the composite base member 122. Also shown in FIG. 20 is the application of heat 314 as may be required for curing the structural assembly 120. As mentioned above, the resin 190 may be a thermosetting resin or a thermoplastic resin. Thermosetting resin may be provided in a liquid state at room temperature. To facilitate curing, the resin 190 may optionally be heated from ambient temperature (e.g., room temperature of 68° F.) to a consolidation temperature and/or to a cure temperature at which the thermosetting resin starts to cross-link and polymerize.

In some examples, the resin 190 may be cured in a multi-stage curing process in which the thermosetting resin is heated from ambient temperature to a first temperature (e.g., an intermediate temperature) and holding for a first hold period to allow for consolidation and outgassing of the composite base member 122 during a first stage of the multi-stage curing process. Following the first hold period, the method may further include heating the composite base member 122 from the first temperature to a second temperature which may be the cure temperature of the thermosetting resin. The second temperature may be held for a second hold period during a second stage of the multi-stage curing process. The second stage may allow the thermosetting resin to cure to form the cured composite structure 110 which may then be actively and/or passively cooled back down to room temperature. In a specific example of a two-stage curing process in which the resin 190 is a thermosetting resin, during the first stage, the structural assembly 120 may be heated to a first temperature of from 260-290° F. for a first hold period of 170-190 minutes. During the second stage, the structural assembly 120 may be heated from the first temperature to a second temperature of from 340-370° F. for a second hold period of 80-100 minutes. In a preferred example, during the first stage, the first temperature may be in the range of 270-280° F. for a first hold period of 175-185 minutes. During the second stage, the second temperature may be in the range of 350-360° F. for a second hold period of 85-95 minutes.

For examples where the structural assembly 120 is infused with thermoplastic resin, the application of heat 314 may be required to reduce the viscosity of the thermoplastic resin to a liquid state to allow for vacuum-assisted drawing of the thermoplastic resin from the resin container 302 into the composite base member 122. Heat 314 may also be applied to the structural assembly 120 to facilitate resin infusion and wet out of the dry fiber material 126 of the composite base member 122. Regardless of whether the resin 190 is a thermoplastic resin or a thermosetting resin, heat 314 may be applied by any one a variety of different mechanisms including, but not limited to, forced air heating, convection heating, induction heating, or other types of heating.

Figure 21:
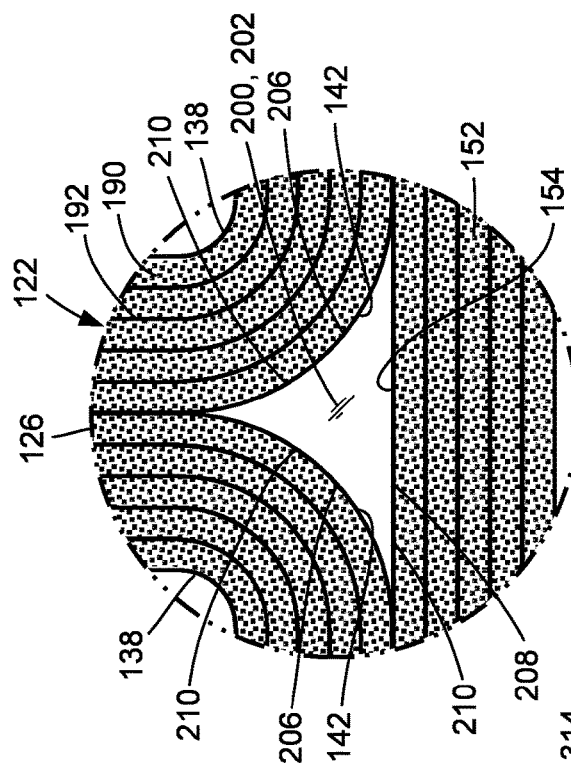
FIG. 21 is a magnified view of the portion of FIG. 20 identified by reference numeral 21 and illustrating resin infused into the dry fiber material of the composite base member and the composite strip.

Referring to FIG. 21, shown is a magnified view of the radius filler element 200 encapsulated by the surrounding structure of the composite base member 122 of FIG. 20 and illustrating resin 190 infused into the dry fiber material 126 of the composite base member 122 and the composite strip 152. As described below, during infusion and curing of the resin 190 (e.g., either thermosetting resin or thermoplastic resin), the solvent 192 in the resin 190 chemically reacts with the radius filler material 202 along the side surface interfaces 210 between the concave surfaces 206 of the radius filler element 200 and the radius cavity surfaces 142 of the web-flange transitions 138 of the composite channels 130. In addition, the solvent 192 in the resin 190 chemically reacts with the radius filler material 202 between the flat surface 208 of the radius filler element 200 and the panel surface 154 of the composite strip 152 or composite panel (not shown).

Although step 504 of infusing the resin 190 into the composite base member 122 is described in the context of vacuum-assisted resin transfer molding (VARTM), resin 190 may be infused into the dry fiber material 126 of a composite base member 122 using any one of a variety of alternative mechanisms. For example, resin 190 may be infused using a conventional resin transfer molding (RTM) process in which resin 190 is injected or pumped in liquid form (e.g., from a resin container 302) into the dry fiber material 126 until substantially uniformly distributed throughout the composite base member 122. In any of the examples disclosed herein, resin 190 may be infused into a composite base member 122 supported on a one-sided mold such as a cure tool 300 shown in FIGS. 18 and 20. In an alternative example not shown, resin 190 may be infused into a composite base member 122 encapsulated within a closed mold, which may include two (2) cure tools (not shown) assembled together. In another example, resin 190 may be infused into the dry fiber material 126 of a composite base member 122 using resin film infusion (RFI) which may involve applying one or more films (not shown) of resin laid up directly underneath, on top of, and/or interleaved within the composite layers of dry fiber material 126 of a composite base member 122. The application of heat 314 may reduce the viscosity of the resin film while vacuum pressure is simultaneously applied as a means to infuse the resin substantially uniformly throughout the dry fiber material 126. In a still further example, resin 190 may be infused into the dry fiber material 126 of the composite base member 122 using a bulk resin infusion (BRI) process which may involve heating bulk resin (not shown) in gel or solid form and positioned in non-contacting adjacent relation to one side of the composite base member 122. The application of heat 314 (e.g., FIG. 20) may reduce the viscosity of the bulk resin 190 to a liquid state. The application of vacuum pressure may draw the liquid resin 190 into the dry fiber material 126 until substantially uniformly distributed throughout the composite base member 122.

Referring to FIG. 22, step 506 of the method 500 includes chemically reacting the resin 190 (e.g., the solvent 192) with the radius filler material 202 to create a mixture 194 of resin 190 and radius filler material 202 within a mixture zone 196 which is shown in an exaggerated width or thickness in FIG. 22. As mentioned above, the mixture zone 196 may be located along the side surface interfaces 210 between the radius filler element 200 and the composite base member 122. The solvent 192 may be described as a chemical reactant configured to at least partially chemically dissolve and/or at least partially chemically melt the radius filler material 202 that the solvent 192 comes into contact with. The solvent 192 in the resin 190 may chemically melt at least a portion of the radius filler element 200 along the radius filler side surfaces 204 between the radius filler element 200 and the composite base member 122.

Step 508 of the method 500 includes curing the resin 190. For a thermosetting resin, curing may be initiated by applying heat 314 (e.g., FIG. 20) and/or by adding a hardener or a catalyst to the resin 190 to initiate polymerization (e.g., cross-linking) of the thermosetting resin. Alternatively or additionally, curing of the thermosetting resin may be initiated or facilitated by the application of radiation (e.g., electron-beam, x-ray, microwave, ultraviolet, etc.). For thermoplastic resin, heat 314 may be applied to reduce the viscosity of the resin 190 from a gel or solid state to a liquid state to allow for resin infusion as mentioned above. After the thermosetting resin or thermoplastic resin is substantially uniformly distributed throughout the dry fiber material 126 (e.g., FIG. 19) of the composite base member 122, and after the solvent 192 in the resin 190 chemically reacts with the radius filler material 202, the structural assembly 120 may be allowed to cool to produce the cured composite structure 110 (e.g., FIG. 5). During resin infusion and curing or solidification, vacuum pressure may be applied to the vacuum bag 306 (e.g., FIG. 20) for applying compaction pressure 312 (e.g., via the caul plates 304—FIG. 20) for consolidating the structural assembly 120. As mentioned above, the curing or solidification process may be performed in an autoclave or the curing or solidification may be performed in an out of-autoclave process such as in an oven.

Referring to FIG. 22, step 510 of the method 500 includes allowing the solvent 192 in the resin 190 to evaporate or flash off, causing hardening of the mixture 194 and bonding of the radius filler element 200 to the composite base member 122 and resulting in the cured composite structure 110 (e.g., FIG. 5). The evaporation of the solvent 192 may occur simultaneously with the curing or solidification of the resin 190. In other examples, the time period of evaporation of the solvent 192 may at least partially overlap the time period of the curing or solidification of the resin 190. As mentioned above, the evaporation of the solvent 192 causes hardening of the mixture 194 within the mixture zones 196 that surround the radius filler element 200. The hardening of the mixture 194 results in the structural integration of the radius filler element 200 with the composite base member 122 along the side surface interfaces 210. The mixture 194 may result in a blended bondline along the side surface interfaces 210 where the radius filler element 200 is fused to the composite base member 122. Advantageously, the blended bondline between the radius filler element 200 and the composite base member 122 significantly reduces the propensity for cracks to develop in the bondline, which results in a significant improvement in the strength and durability of the cured composite structure 110.

Referring to FIG. 22, in some cured composite structure 110 examples, the mixture 194 when hardened may have a higher strength than the weaker of the radius filler material 202 of the radius filler element 200 and the composite base member 122 when cured (e.g., without a radius filler material 202). In other cured composite structure 110 examples, the mixture 194 when hardened may have a higher strength than either the radius filler material 202 or the composite base member 122 when cured (e.g., without a radius filler material 202). As shown in the cross-sectional view of FIG. 22, the mixture 194 of resin 190 and radius filler material 202 along each of the side surface interfaces 210 may occur as a gradient of resin concentration. For example, the mixture zone 196 may have a gradient of higher concentration of resin 190 proximate the composite base member 122, and a lower concentration of resin 190 proximate the radius filler element 200.

Referring to FIGS. 23-25, shown in FIG. 23 is a side sectional view of an example of a structural assembly 120 having a radius filler element 200 comprised of a plurality of radius filler segments 220 in end-to-end arrangement similar to the above-described example shown in FIGS. 11-12. In FIG. 23, the radius filler segments 220 are captured between the composite base member 122 and the composite strip 152 which is supported on the cure tool 300 as shown in FIG. 20. FIG. 24 is a magnified view of a portion of the structural assembly 120 showing the segment ends 222 of a pair of end-to-end radius filler segments 220. A vacuum bag 306 seals the structural assembly 120 to a cure tool 300, and compaction pressure 312 and heat 314 are applied during the infusion of resin 190 (e.g., FIG. 25) into the dry fiber material 126 of the composite base member 122.

For the arrangement of end-to-end radius filler segments 220 shown in FIGS. 23-25, step 506 of chemically reacting the resin 190 (e.g., FIG. 25) with the radius filler element 200 may include chemically reacting the resin 190 with the segment ends 222 of end-to-end pairs of the plurality of radius filler segments 220 to bond together the segment ends 222 and thereby form a continuous radius filler element 200. More specifically, the resin 190 chemically reacts with the radius filler material 202 at the segment ends 222 forming the above-described mixture 194 between adjacent pairs of end surfaces 224. FIG. 25 is a magnified view of the portion of the adjacent end surfaces 224 of a pair of the end-to-end radius filler segments 220. During resin infusion of the composite base member 122, capillary action may draw some of the resin 190 between the end surfaces 224 of adjacent pairs of end-to-end radius filler segments 220 and may create a mixture zone 196 surrounding each one of the segment ends 222.

The above-described step 510 of allowing the solvent 192 to evaporate may include allowing the solvent 192 to evaporate the resin 190 between the end surfaces 224, causing hardening of the mixture 194 of resin 190 and radius filler material 202 between each end-to-end pair of radius filler segments 220 and thereby bonding the radius filler segments 220 together. The process of chemically reacting the resin 190 with the radius filler material 202 and hardening of the resulting mixture 194 between the segment ends 222 of adjacent radius filler segments 220 is similar to the above-described manner in which hardened mixture 194 bonds the radius filler side surfaces 204 to the composite base member 122. The bonding together of the radius filler segments 220 may result in a continuous radius filler element 200 that may extend along the length of the composite base member 122. In this regard, at each one of the end-to-end interfaces 228, a blended bondline may be formed which may reduce the propensity for cracks that may otherwise develop in the composite base member 122 at the location of the segment ends 222 between adjacent pairs of radius filler segments 220.

Referring to FIG. 26, shown is an example of an uncured structural assembly 120 (e.g., a composite stringer 114) comprising a composite base member 122 formed of dry fiber material 126 and containing a radius filler element 200 formed of radius filler material 202. FIG. 27 shows an example of a cured composite structure 110 produced by co-curing or co-bonding a plurality of structural assemblies 120 of FIG. 26 with a composite skin panel 150. For producing the cured composite structure 110 of FIG. 26, the composite skin panel 150 and structural assemblies 120 may be placed on a cure tool 300 (not shown) and covered with a vacuum bag 306 similar to the above-described example shown in FIGS. 18 and 20. Resin 190 may be infused into the dry fiber material 126 of the structural assemblies 120 and into the dry fiber material 126 of the composite skin panel 150 in the same manner as described above for the composite stringer 114 shown in FIGS. 18 and 20. Solvent 192 in the resin 190 chemically reacts with the radius filler material 202 of each of the radius filler elements 200 resulting in a mixture 194 of resin 190 and radius filler material 202 along the side surface interfaces 210 between the composite base member 122 and composite skin panel 150 and the radius filler element 200 of each one of the structural assemblies 120. Upon evaporation of the solvent 192 and hardening of the mixture 194, each of the radius filler elements 200 is chemically bonded to the composite base member 122 and the composite skin panel 150.

The resulting cured composite structure 110 includes the composite skin panel 150 and a plurality of composite base members 122 comprised of reinforcing fibers embedded in resin 190. A radius filler element 200 is encapsulated between the composite skin panel 150 and each of the composite base members 122. As mentioned above, each radius filler element 200 is homogenous and is formed of radius filler material 202. The cured composite structure 110 includes a mixture zone 196 (e.g., FIG. 22) bonding the radius filler side surfaces 204 (e.g., FIG. 20) of each radius filler element 200 to the corresponding composite base member 122 and to the composite skin panel 150. As described above, each mixture zone 196 (e.g., FIG. 22) is a hardened mixture 194 of resin 190 and radius filler material 202. As mentioned above, FIG. 27 illustrates one example of a cured composite structure 110 that may be manufactured using the above-described method. However, a cured composite structure 110 may be part of any one a variety of different types of structures, systems and/or vehicles. In the context of an aircraft 100 shown in FIGS. 1-2, the cured composite structure 110 may be a composite stringer 114 or a composite spar 116, or any one a variety of other aircraft components.

As mentioned above, FIG. 28-30 show non-limiting examples of different cross-sectional configurations of cured composite structures 110 produced by using different cross sections of composite channels 130 for the composite base member 122. For example, FIG. 28 shows an example of a cured composite structure 110 having a J-shaped cross section 172 formed by assembling a Z-shaped composite channel 130 with an L-shaped composite channel 130. FIG. 29 shows an example of a cured composite structure 110 having an I-shaped cross section 174 formed by assembling a pair of C-shaped composite channels 130 in back-to-back relation with each other. FIG. 30 shows an example of a cured composite structure 110 having a hat-shaped cross section 176 formed by assembling a primary laminate 178, a wrap laminate 180, and a composite strip 152 to collectively encapsulate a pair of radius filler elements 200.

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the spirit and scope of the disclosure.

What is claimed is:

1. A method of manufacturing a composite structure, comprising:
   placing a radius filler element into a radius cavity extending along a length of a composite base member formed of dry fiber material comprised of reinforcing fibers, the radius filler element being formed of a radius filler material;
   infusing resin into the dry fiber material;
   chemically reacting the resin with the radius filler material to create a mixture of resin and radius filler material within a mixture zone along side surface interfaces between the radius filler element and the composite base member;
   curing or solidifying the resin;
   allowing solvent in the resin to evaporate causing hardening of the mixture and bonding, within the mixture zone, of the radius filler element to the composite base member, and resulting in a cured composite structure wherein:
      the radius filler material is contiguous and homogenous throughout the radius filler element, excluding the mixture zone; and
      the mixture zone has a higher strength than the radius filler material, and a higher strength than the resin in a cured state without the radius filler material.

2. The method of claim 1, wherein the steps of placing the radius filler element into the radius cavity, chemically reacting the resin with the radius filler element, and allowing the solvent to evaporate respectively include:
   inserting a plurality of radius filler segments into the radius cavity, the plurality of radius filler segments being in end-to-end arrangement within the radius cavity and each having opposing segment ends;
   chemically reacting the resin with the segment ends of end-to-end pairs of the plurality of radius filler segments to bond together and form the radius filler element that extends continuously along the length of the composite base member; and
   allowing the solvent to evaporate causing hardening of the mixture between each end-to-end pair of radius filler segments and bonding the radius filler segments together to define the radius filler element.

3. The method of claim 1, wherein the step of infusing the resin comprises one of:
   resin transfer molding;
   vacuum-assisted resin transfer molding;
   resin film infusion; and
   bulk resin infusion.

4. The method of claim 1, further comprising:
   manufacturing the radius filler element by one of: three-dimensional printing, selective laser sintering, fused filament fabrication, die extrusion, injection molding.

5. The method of claim 1, wherein:
   the radius filler material has a Young's modulus that is less than the Young's modulus of the composite base member.

6. The method of claim 1, wherein:
   the radius filler material has a percent elongation at failure that is greater than the percent elongation at failure of the composite base member.

7. The method of claim 1, wherein the radius filler material is one of:
   a radius filler thermoplastic material comprised of at least one of: acrylonitrile butadiene styrene (ABS), acrylic-styrene-acrylonitrile (ASA), polyethylene terephthalate (PET), polyphenylene sulfide (PPS), polylactic acid (PLA), polycarbonate material, polyether ether ketone (PEEK), polyether ketone ketone (PEKK), copolymeric material;
a radius filler thermosetting material comprised of at least one of: polyurethanes, phenolics, polyimides, sulphonated polymer, a conductive polymer, benzoxazines, bismaleimides, cyanate esthers, vinyl esters, polyesters, epoxies, and silsesquioxanes.

8. The method of claim 1, further comprising:
fabricating the composite base member by arranging two composite components in back-to-back relation to each other forming the radius cavity.

9. The method of claim 1, wherein:
the resin infused into the composite base member comprises one of thermosetting resin and thermoplastic resin;
the thermoplastic resin comprises one of the following: acrylonitrile butadiene styrene (ABS), acrylic-styrene-acrylonitrile (ASA), polyethylene terephthalate (PET), polyphenylene sulfide (PPS), polylactic acid (PLA), polycarbonate material, polyether ether ketone (PEEK), polyether ketone ketone (PEKK), copolymeric material, acrylics, fluorocarbons, polyamides, polyolefins, polyesters, polycarbonates, polyurethanes, polyetherimides, polyethersulfone, polysulfone, polystyrene, and polyphenylsulfone;
the thermosetting resin comprises one of the following: polyurethanes, phenolics, polyimides, sulphonated polymer, a conductive polymer, benzoxazines, bismaleimides, cyanate esthers, vinyl esters, polyesters, epoxies, and silsesquioxanes;
the solvent in the resin is a polar aprotic solvent, the polar aprotic solvent comprising acetone; and
the reinforcing fibers are formed of at least one of the following materials: plastic, glass, ceramic, carbon, metal, or any combination thereof.

10. A cured composite structure, comprising:
a composite base member comprised of reinforcing fibers embedded in resin, and having a radius cavity extending along a length of the composite base member;
a radius filler element extending continuously along a length of the radius cavity and having radius filler side surfaces, the radius filler element being formed of a radius filler material;
a mixture zone bonding the radius filler side surfaces to the composite base member and comprised of a hardened mixture of the resin and the radius filler material;
wherein:
the radius filler material is contiguous and homogenous throughout the radius filler element, excluding the mixture zone; and
the mixture zone has a higher strength than the radius filler material, and a higher strength than the resin in a cured state without the radius filler material.

11. The cured composite structure of claim 10, wherein:
the radius filler element is comprised of at least two radius filler segments in end-to-end arrangement within the radius cavity and bonded by a mixture zone of hardened mixture located between segment ends of the radius filler segments.

12. The cured composite structure of claim 10, wherein:
the mixture zone bonding the radius filler side surfaces to the composite base member has a gradient of higher concentration of resin proximate the composite base member and a lower concentration of resin proximate the radius filler element.

13. The cured composite structure of claim 10, wherein:
the radius filler material has a Young's modulus that is less than the Young's modulus of the composite base member.

14. The cured composite structure of claim 10, wherein:
the radius filler material has a percent elongation at failure that is greater than the percent elongation at failure of the composite base member.

15. The cured composite structure of claim 10, wherein the radius filler material is one of:
a radius filler thermoplastic material comprised of at least one of: acrylonitrile butadiene styrene (ABS), acrylic-styrene-acrylonitrile (ASA), polyethylene terephthalate (PET), polyphenylene sulfide (PPS), polylactic acid (PLA), polycarbonate material, polyether ether ketone (PEEK), polyether ketone ketone (PEKK), copolymeric material;
a radius filler thermosetting material comprised of at least one of: polyurethanes, phenolics, polyimides, sulphonated polymer, a conductive polymer, benzoxazines, bismaleimides, cyanate esthers, vinyl esters, polyesters, epoxies, and silsesquioxanes.

16. The cured composite structure of claim 10, wherein:
the composite base member is formed of two composite components arranged in back-to-back relation to each other and forming the radius cavity.

17. The cured composite structure of claim 10, wherein:
the resin in the composite base member comprises one of thermosetting resin and thermoplastic resin;
the thermoplastic resin comprises one of the following: acrylonitrile butadiene styrene (ABS), acrylic-styrene-acrylonitrile (ASA), polyethylene terephthalate (PET), polyphenylene sulfide (PPS), polylactic acid (PLA), polycarbonate material, polyether ether ketone (PEEK), polyether ketone ketone (PEKK), copolymeric material, acrylics, fluorocarbons, polyamides, polyolefins, polyesters, polycarbonates, polyurethanes, polyetherimides, polyethersulfone, polysulfone, polystyrene, and polyphenyl sulfone;
the thermosetting resin comprises one of the following: polyurethanes, phenolics, polyimides, sulphonated polymer, a conductive polymer, benzoxazines, bismaleimides, cyanate esthers, vinyl esters, polyesters, epoxies, and silsesquioxanes; and
the reinforcing fibers are formed of at least one of the following materials: plastic, glass, ceramic, carbon, metal, or any combination thereof.

18. The cured composite structure of claim 10, having at least one of the following configurations:
the radius filler element has a cross-sectional area that varies along a lengthwise direction of the composite base member; and
the mixture zone has a cross-sectional area that varies in relation to the cross-sectional area of the radius filler element along the lengthwise direction of the cured composite structure.

19. A cured composite structure, comprising:
one of a composite stringer or a composite spar of an aircraft, including:
a composite base member comprised of reinforcing fibers embedded in resin and having a radius cavity extending along a length of the composite base member;
a radius filler element extending continuously along a length of the radius cavity and having radius filler side surfaces, the radius filler element being formed of a radius filler material;

a mixture zone bonding the radius filler side surfaces to the composite base member and comprised of a hardened mixture of the resin and the radius filler material; wherein:
- the radius filler material is contiguous and homogenous throughout the radius filler element, excluding the mixture zone; and
- the mixture zone has a higher strength than the radius filler material, and a higher strength than the resin in a cured state without the radius filler material.

20. The cured composite structure of claim 19, wherein: the radius filler element is comprised of at least two radius filler segments in end-to-end arrangement within the radius cavity and bonded by a mixture zone of hardened mixture located between segment ends of the radius filler segments.

\* \* \* \* \*